US008711785B2

(12) United States Patent
Gholmieh et al.

(10) Patent No.: US 8,711,785 B2
(45) Date of Patent: Apr. 29, 2014

(54) FAST CARRIER ALLOCATION IN MULTI-CARRIER SYSTEMS

(75) Inventors: Aziz Gholmieh, Del Mar, CA (US); Danlu Zhang, San Diego, CA (US); Sharad Deepak Sambhwani, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1187 days.

(21) Appl. No.: 12/409,714

(22) Filed: Mar. 24, 2009

(65) Prior Publication Data
US 2009/0257387 A1    Oct. 15, 2009

Related U.S. Application Data

(60) Provisional application No. 61/039,165, filed on Mar. 25, 2008.

(51) Int. Cl.
*H04W 4/00* (2009.01)

(52) U.S. Cl.
USPC ......................................................... 370/329

(58) Field of Classification Search
USPC ......... 370/329, 335, 318, 252, 328, 229, 340, 370/311, 336, 341–431, 464–503; 714/748; 544/436–522; 455/525, 450, 63.1, 455/67.13; 375/346, 132
See application file for complete search history.

(56) References Cited

U.S. PATENT DOCUMENTS 6,591,399 B1 * 7/2003 Wyrzykowska et al. ...... 716/102
6,636,497 B1 * 10/2003 Honkasalo et al. ........... 370/335
7,054,284 B2 * 5/2006 Jou et al. ....................... 370/329
7,426,176 B2   9/2008 Liu et al.
7,580,399 B2 * 8/2009 Hart .............................. 370/338
7,710,893 B2 * 5/2010 Yoon et al. .................... 370/252

(Continued)

FOREIGN PATENT DOCUMENTS

KR   20080021159 A    3/2008
RU       2216866      11/2003

(Continued)

OTHER PUBLICATIONS

Eiko Seidel: "Technology of high speed packet access (HSPA)" Nomor Research, [Online] Oct. 1, 2006, pp. 1-5, XP002552313, the whole document.

(Continued)

*Primary Examiner* — Chi Pham
*Assistant Examiner* — Alexander O Boakye
(74) *Attorney, Agent, or Firm* — Darren M. Simon

(57) ABSTRACT

Providing for fast allocation of additional carriers in multi-carrier wireless communication systems is described herein. By way of example, high layer protocols can be employed to allocate additional carriers to UEs in a wireless network. Additionally, management of the additional carriers can be accomplished via high speed lower layer signaling protocols. Management can involve activating/deactivating the additional carriers, instructing the UE to provide carrier feedback, monitor pilot or control channels of such carriers, or the like. Because lower layer signaling is relatively fast, activation or deactivation of the additional carrier can be quickly implemented in response to contemporaneous changes in channel conditions. Thus, changes to signal quality or network loading can be determined and utilized to customize carrier activation in near real-time, providing efficient resource allocation while conserving UE battery life.

64 Claims, 14 Drawing Sheets

(56) References Cited

U.S. PATENT DOCUMENTS

| | | | |
|---|---|---|---|
| 8,045,507 B2* | 10/2011 | Kim et al. | 370/328 |
| 8,130,694 B2* | 3/2012 | Lee et al. | 370/318 |
| 8,363,603 B2 | 1/2013 | Dong et al. | |
| 2006/0125149 A1 | 6/2006 | Takada et al. | |

FOREIGN PATENT DOCUMENTS

| | | | |
|---|---|---|---|
| WO | WO9914878 | | 3/1999 |
| WO | WO2006125149 A2 | | 11/2006 |
| WO | WO 2008092745 | * | 1/2008 |
| WO | WO 2009/120124 | * | 9/2008 |

OTHER PUBLICATIONS

Ericsson et al: "Text Proposal for DC-HSDPA assumptions and standards impact" 3GPP Draft; R1-082249 Text Proposal for DC-HSDPA Assumptions and Standards Impact, 3rd Generation Partnership Project (3GPP), Mobile Competence Centre; 650, Route Des Lucioles; F-06921 Sophia-Antipolis Cedex; France, vol. RAN WGI, no. Kansas City, Usa; 20080523, May 23, 2008, XP050110541.

International Search Report & Written Opinion—PCT/US2009/038245, International Search Authority—European Patent Office—Nov. 9, 2009.

Taiwan Search Report—TW098109796—TIPO—Apr. 12, 2012.

* cited by examiner

FAST CARRIER ALLOCATION IN MULTI-CARRIER SYSTEMS

CLAIM OF PRIORITY UNDER 35 U.S.C. §119

The present Application for Patent claims priority to U.S. Provisional Application Ser. No. 61/039,165 entitled FAST CARRIER ALLOCATION IN MULTI-CARRIER HSPA SYSTEMS and filed Mar. 25, 2008, the entirety of which is expressly incorporated by reference herein.

BACKGROUND

I. Field

The following relates generally to wireless communication, and more specifically to allocation of multi-carrier wireless channels in a wireless communication environment.

II. Background

Wireless communication systems are widely deployed to provide various types of communication content and services such as, e.g. voice content, data content, video content, packet data services, broadcast services, messaging services, multimedia services, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via a single-in-single-out (SISO) system, a multiple-in-single-out (MISO) system, or a multiple-in-multiple-out (MIMO) system.

Wireless communication systems typically employ a particular carrier frequency for transmitting information. The carrier frequency chosen can depend on a type of the wireless system. For instance, cellular systems employ a government-licensed frequency spectra, whereas other systems (e.g. radio, WiFi, etc.) employ non-licensed spectra. In addition, bandwidth of the carrier frequency is related to an amount of data that can be conveyed in a period of time, also referred to as throughput or data rate.

Although a carrier bandwidth is generally fixed by a particular wireless system (e.g. 2 megahertz [MHz], 2.5 MHz, 5 MHz, and so on), multi-carrier systems have recently been developed to increase bandwidth for applications requiring high data rates. Furthermore, multi-carrier systems can yield improved resource utilization and spectrum efficiency by joint resource allocation and load balancing across the multiple carriers. In a multi-carrier system, a terminal can be allocated multiple carrier channels, which are aggregated by the terminal to increase the rate at which information is transmitted to or from the terminal. When traffic requirements for the terminal diminish, the additional carrier(s) can be released, freeing up a channel for other terminals.

As an example of the foregoing, multi-carrier high speed packet access (MC-HSPA) is an evolution of the HSPA systems, in which two 5 MHz carrier channels are aggregated to increase channel bandwidth, resulting in increased throughput and data rates. The MC-HSPA system is backward compatible for terminals designed with older protocols, such as the third generation partnership project (3GPP) Release 7 (R7), R6, R5, and Release '99 (R99). In addition, for operators the MC-HSPA system enables efficient and flexible spectrum asset utilization even though multiple carriers licensed to the operator are not contiguous within the frequency spectrum.

Despite the benefits, some problems associated with multi-carrier systems exist. First, terminals typically are required to demodulate or decode over multiple carriers, significantly increasing processor consumption. This has an adverse affect on battery life for the terminal. Furthermore, the terminal is often required to provide additional feedback information to a serving network, including downlink channel conditions and transmission results on each of the multiple carriers. Additional costs can be associated with multiple uplink carriers as well. Accordingly, a multi-carrier system that mitigates terminal battery drain while maintaining flexibility, throughput and reduced latency would provide a significant advantage over existing multi-carrier systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for fast allocation of additional carriers in multi-carrier wireless communication systems. In some aspects of the subject disclosure, lower layer signaling protocols can be employed to manage user equipment (UE) access to additional carriers. Because lower layer signaling is relatively fast (e.g., having a TTI as low as 2 milliseconds [2 ms]), activation or deactivation of the additional carrier can be quickly implemented in response to contemporaneous changes in channel conditions.

According to particular aspects of the subject disclosure, low layer multi-carrier management can employ physical layer signaling or layer two signaling, or a suitable combination thereof. Layer two signaling can comprise inferred commands based on discontinuous transmission (DTX) or discontinuous reception (DRX) signaling to a UE. Physical layer signaling can employ shared control channel (SCCH) or high speed SCCH (HS-SCCH) orders providing explicit multi-carrier management commands. Once the UE receives or decodes a command, the UE can adjust its state in regard to the multi-carrier system and send an acknowledgment to the network in response to the command. Accordingly, a UE can rapidly activate or deactivate additional carriers to accommodate high demand traffic, while preserving battery power for lower demand periods.

According to particular aspects of the subject disclosure, provided is a method for wireless communications. The method can comprise obtaining notification of a multi-carrier assignment for a user equipment (UE) in a wireless network. The method can further comprise employing a data processor to execute rules for managing UE interaction with at least one carrier of the multi-carrier assignment, wherein the rules comprise analyzing a wireless condition pertaining to the UE or the wireless network and generating a UE command pertaining to the at least one carrier based on the wireless condition. Moreover, the method can comprise employing a communication interface to convey the command to the UE via lower layer signaling.

In other aspects of the subject disclosure, provided is an apparatus for wireless communications. The apparatus can comprise a data processor that executes a set of modules configured for managing UE interaction with a non-anchor wireless carrier. Furthermore, the set of modules can comprise an interface module that obtains a notification of multi-carrier assignment for a UE served by the apparatus, an analysis module that measures a wireless condition pertaining to a UE and a control module that generates a management order for the UE pertaining to the non-anchor wireless carrier. In addition to the foregoing, the apparatus can comprise a communication interface that conveys the management order to the UE on a lower layer signal.

According to further aspects, disclosed is an apparatus for wireless communications. The apparatus can comprise means for obtaining notification of a multi-carrier assignment for a UE in a wireless network. Additionally, the apparatus can comprise means for employing a data processor to execute rules for managing UE interaction with at least one carrier of the multi-carrier assignment. Specifically, the rules for managing the UE can include analyzing a wireless condition pertaining to the UE or the wireless network and generating a UE command pertaining to the at least one carrier based on the wireless condition. In addition to the foregoing, the apparatus can comprise means for conveying the command to the UE via lower layer signaling.

In one or more other aspects, provided is at least one processor configured for wireless communications. The processor(s) can comprise a first module for obtaining notification of a multi-carrier assignment for a UE in a wireless network and a second module for analyzing a wireless condition pertaining to the UE or the wireless network. Furthermore, the processor(s) can comprise a third module for generating a UE command pertaining to the at least one carrier based on the wireless condition and a fourth module for conveying the command to the UE via lower layer signaling.

According to other aspects, a computer program product comprising a computer-readable medium is disclosed herein. The computer-readable medium can comprise a first set of codes for causing a computer to obtain notification of a multi-carrier assignment for a UE in a wireless network and a second set of codes for causing the computer to analyze a wireless condition pertaining to the UE or the wireless network. Moreover, the computer-readable medium can comprise a third set of codes for causing the computer to generate a UE command pertaining to the at least one carrier based on the wireless condition and a fourth set of codes for causing the computer to convey the command to the UE via lower layer signaling.

Further to the above, disclosed is a method for participating in wireless communications. The method can comprise employing a wireless communication interface to obtain a multi-carrier assignment from a wireless network component. Further, the method can comprise employing the communication interface to obtain a physical layer or layer two signaling protocol message. Additionally, the method can comprise employing a data processor to extract a command pertaining to a non-anchor carrier of the multi-carrier assignment from the message.

According to other aspects, provided is an apparatus for participating in wireless communications. The apparatus can comprise a wireless communication interface that obtains a multi-carrier assignment on one layer of a wireless signaling protocol, and a command pertaining to the multi-carrier assignment on a different layer of the wireless signaling protocol. Moreover, the apparatus can comprise a data processor for processing the command and executing a set of modules for implementing the command.

According to still other aspects, disclosed is an apparatus for participating in wireless communications. The apparatus can comprise means for employing a wireless communication interface to obtain a multi-carrier assignment from a wireless network component. In addition, the apparatus can comprise means for employing the communication interface to obtain a physical layer or layer two signaling protocol message. Furthermore, the apparatus can comprise means for employing a data processor to extract a command pertaining to a non-anchor carrier of the multi-carrier assignment from the message.

In at least one other aspect of the subject disclosure, provided is at least one processor configured for participating in wireless communications. The processor(s) can comprise a first module for employing a wireless communication interface to obtain a multi-carrier assignment from a wireless network component. The processor(s) can also comprise a second module for employing the communication interface to obtain a physical layer or layer two signaling protocol message. Further to the above, the processor(s) can comprise a third module for employing a data processor to extract a command pertaining to a non-anchor carrier of the multi-carrier assignment from the message.

According to further aspects, provided is a computer program product comprising a computer-readable medium. The computer-readable medium can comprise a first set of codes for causing a computer to employ a wireless communication interface to obtain a multi-carrier assignment from a wireless network component. In addition, the computer-readable medium can comprise a second set of codes for causing the computer to employ the communication interface to obtain a physical layer or layer two signaling protocol message. Moreover, the computer-readable medium can comprise a third set of codes for causing the computer to employ a data processor to extract a command pertaining to a non-anchor carrier of the multi-carrier assignment from the message.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
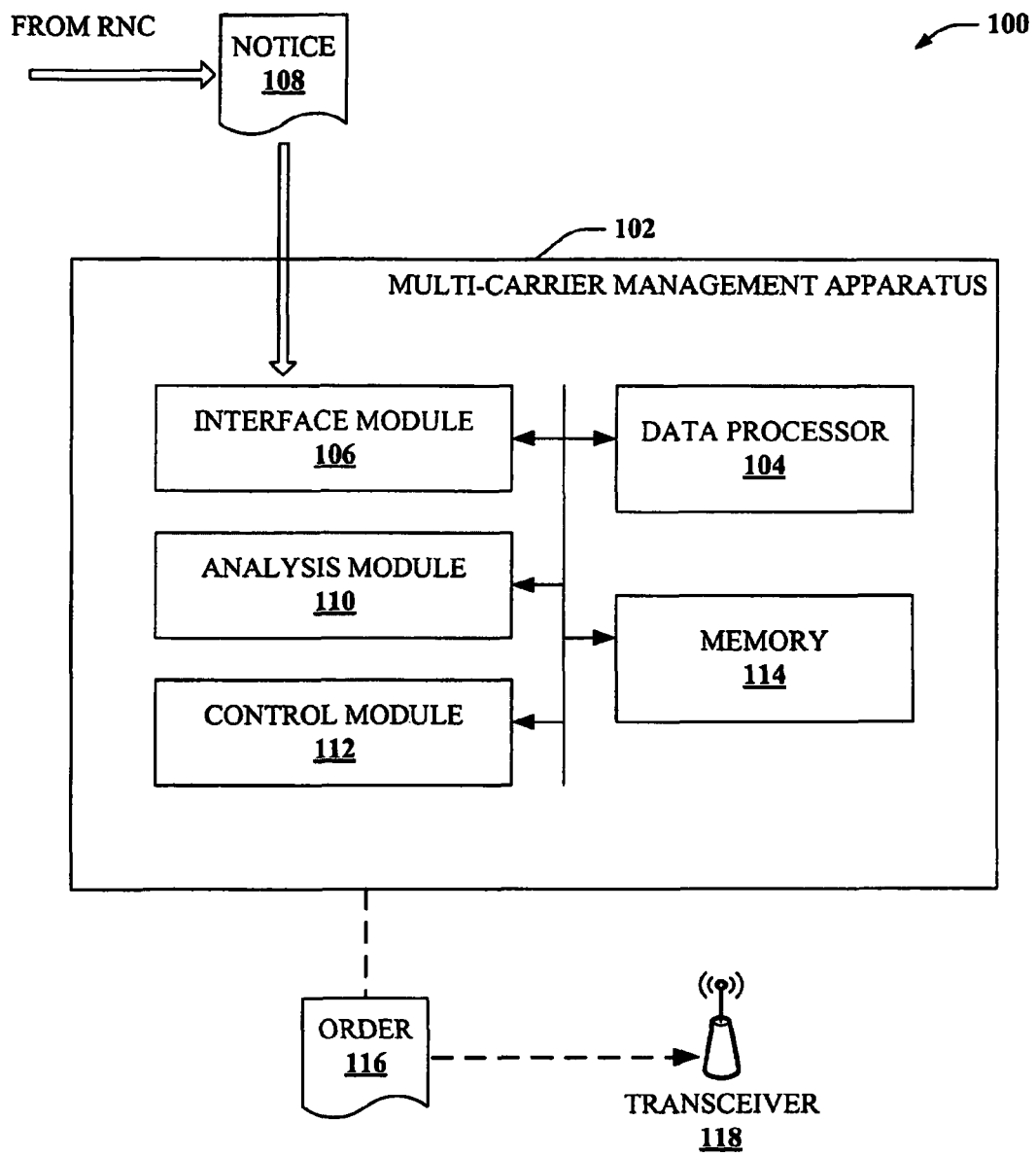
FIG. 1 illustrates a block diagram of an example system that provides fast carrier allocation according to aspects disclosed herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of employing lower carrier signaling for fast carrier allocation in a multi-carrier wireless system. One skilled in the art should appreciate that similar techniques could apply to other communication environments.

In multi-carrier wireless communication systems (e.g., high speed packet access [HSPA]), an additional carrier(s) can provide significant benefits for each access terminal (AT) within a wireless network. Furthermore, the additional carrier(s) can also increase flexibility and reduce loading problems for network operators. However, due to increased AT processing requirements and other considerations, multi-carrier systems can have some drawbacks as well.

Typically, utilizing a second carrier can significantly increase overhead in feedback control channels. Where an AT experiences significant path loss, requiring frequent uplink packet feedback, this problem is exacerbated. Furthermore, the second carrier can negatively impact AT battery life as a result of increased processing and transmission involved in utilizing two carriers concurrently.

To mitigate these problems, the subject disclosure provides a mechanism to analyze wireless channel conditions, such as path loss, and dynamically manage AT activity on additional carriers (e.g. non-anchor carriers in a multi-carrier allocation). Thus, a network can increase AT activity on a second carrier in low path loss conditions (e.g., activating channel feedback), or decrease AT activity on the second carrier in high path loss conditions (e.g., deactivating channel feedback). As another example, the second carrier can be activated for high data rate traffic, and deactivated for low data rate traffic.

In some aspects of the subject disclosure, a network component (e.g., a radio network controller—or RNC) can employ a layer three protocol to allocate an additional carrier(s) to an AT. A layer three protocol message is sent to the AT, and upon receiving the message the AT aggregates the additional carrier with an anchor carrier. According to further aspects, the network can employ lower layer signaling to dynamically manage AT usage of the second carrier. As one example, shared control channel (SCCH) or high speed SCCH (HS-SCCH) orders can be reserved for explicit commands pertaining to multi-carrier utilization. As another example, discontinuous transmission (DTX) or discontinuous reception (DRX) logic can be employed in sending implicit commands for multi-carrier utilization. The network conveys commands to the AT over-the-air, which responds upon receiving or implementing the command. Where suitable, the network can employ repeat command transmission to mitigate effects of packet loss. Alternatively, or in addition, the AT can acknowledge (ACK) or negative acknowledge (NACK) low layer multi-carrier utilization commands for efficient interaction between the network and AT.

HS-SCCH commands can be sent on each transmission time interval (TTI) or over a set of TTIs, and can be directed to individual ATs (e.g., by encoding a command with a distinct identifier associated with the AT). Accordingly, the AT can be rapidly instructed to activate or deactivate an additional carrier(s) (e.g., non-anchor carrier), activate or deactivate feedback on the additional carrier(s) or pilot/control channel decoding for the additional carrier(s), and so on. Furthermore, activation/deactivation can be in response to changes in channel conditions. Accordingly, battery life and overhead impact of multi-carrier utilization can be significantly improved by high-speed management of non-anchor carriers.

Upon activating or deactivating carriers, an AT can change uplink feedback channels employed to submit channel feedback information (e.g., CQI or packet ACK/NACK data) to a serving wireless network. The updated feedback channels are selected based on a new set of carriers employed by the AT, after receiving the activation/deactivation command. In addition, the AT can further employ a new high-speed dedicated physical control channel (HS-DPCCH) feedback encoding format (e.g., suitable for submitting CQI or ACK/NACK information), where suitable, consistent with the updated feedback channels. The encoding format is utilized for CQI measurements of downlink channels, or ACK/NACK responses for downlink packets sent by the serving wireless network. After selecting updated feedback channels or new encoding format, the new set of feedback channels or encoding format, respectively, is submitted to a base station serving the AT. Accordingly, the base station can then monitor the new channel(s) and employ a new decoding format(s) to obtain and decode feedback information, pertinent to the new set of channels or set of carriers, submitted by the AT.

Referring now to the figures, FIG. 1 illustrates a block diagram of an example system 100 that provides fast carrier allocation in a multi-carrier wireless communication environment. In some aspects of the subject disclosure, AT interaction with non-anchor carriers can be dynamically controlled by system 100, based on time-varying conditions in a network. In at least one aspect of the subject disclosure, higher layer signaling can be employed to allocate or de-allocate non-anchor carriers based on traffic requirements, network loading, or the like. Alternatively, or in addition, lower layer signaling can be employed for multi-carrier optimization, providing efficient network-directed utilization of non-anchor carrier resources. Accordingly, system 100 can achieve higher throughput, data rates and flexibility of multi-carrier systems, while mitigating processing overhead and power consumption at terminals within the network.

System 100 comprises a multi-carrier management apparatus 102. Apparatus 102 can comprise a data processor that executes a set of modules (106, 110, 112) configured for dynamic control of carrier frequencies allocated to user equipment (UE) in a wireless communication network. Specifically, the set of modules (106, 110, 112) can comprise an interface module 106. The interface module 106 is configured to utilize or access wired or wireless communication media (e.g., transmitter 118, or a wired network interface—not depicted) to exchange information with network components or wireless terminals. Specifically, the interface module 106 can obtain a notification 108 of a multi-carrier assignment to a UE served by multi-carrier management apparatus 102.

As one example of the foregoing, interface module 106 can be coupled with a radio network controller (RNC) via a suitable wired or wireless network connection. Thus, for instance, apparatus 102 can employ an Ethernet connection, digital subscriber line (DSL) connection, coaxial cable connection (cable), an intervening network such as an intranet or the Internet, or a WiFi connection, or a suitable combination thereof or of the like to interface to the RNC. The RNC can employ the wired or wireless connection to provide a multi-carrier allocation notice 108 to the interface module 106.

As another example, interface module 106 can be communicatively coupled with a transceiver 118. Transceiver 118 is wirelessly coupled with UEs served by multi-carrier management apparatus 102. Accordingly, upon receiving a multi-carrier assignment from a network RNC, the UE can transmit a notice 108 of the allocation to transceiver 118, which is obtained at interface module 106.

As mentioned above, allocation notice 108 can be generated by a network component and forwarded to interface module 106, or can be routed through a UE (or generated by the UE) and transmitted to transceiver 118. Allocation notice 108 can identify the UE, as well as identify an anchor carrier and non-anchor carriers assigned to the UE. Furthermore, at least in some aspects of the subject disclosure, allocation notice 108 can identify conditions for allocating or de-allocating non-anchor carriers (e.g., traffic requirements) to the UE.

Upon receipt of the allocation notice 108 at interface module 106, data processor 104, coupled to memory 114, executes an analysis module 110 to measure a wireless condition pertinent to a UE. Alternatively, or in addition, the condition can be pertinent to efficiency of a multi-carrier assignment. In some aspects, the condition can comprise a quality or efficiency measurement of a wireless channel, such as path loss, throughput, data rate, or the like. In other aspects, the condition can comprise a loading parameter of a wireless access network. In still other aspects, a combination of the foregoing criteria, or like criteria, can be employed to obtain a measurement of the wireless condition.

Once the measurement is obtained, data processor 104 can execute a control module 112 to generate a management order 116 for a UE served by multi-carrier management apparatus 102. Specifically, the management order 116 can be pertinent to a non-anchor carrier assigned to the UE as part of a multi-carrier allocation. Control module 112 can base the management order 116 on a channel or network measurement provided by analysis module 110. Thus, where the channel/network measurement suggests increased traffic loading in the network, or increased path loss for the UE, the command 116 can instruct the UE to release or deactivate a non-anchor carrier previously allocated to the UE. Conversely, where the channel/network measurement indicates mild or moderate loading, or low path loss conditions for the UE, the command 116 can instruct the UE to retain or reactivate the non-anchor carrier.

In some aspects of the subject disclosure, a multi-carrier management order 116 can comprise a physical layer command utilizing HS-SCCH signaling. In addition, HS-SCCH orders can be generated by the control module 112 as frequent as every TTI (or more or less frequently as suitable). HS-SCCH orders are beneficial in that overhead of high speed signaling is well controlled. Furthermore, HS-SCCH signals can be unicast to particular UEs by encoding the signals with a distinct UE identifier (e.g., a 16-bit ID). The HS-SCCH order can be transmitted on an anchor carrier associated with the UE, or, alternatively, on a non-anchor carrier if the UE is actively monitoring control channels of such carrier.

As an example to illustrate the foregoing, a set of HS-SCCH orders can be reserved for allocation of an additional carrier to a UE (over and above an anchor carrier, for instance). For instance, the set of orders can comprise an activation order and a deactivation order. In at least some aspects of the subject disclosure, additional orders can be reserved for other commands. For example, a pair of HS-SCCH orders can be reserved for activating or deactivating channel feedback on the additional carrier (e.g., CQI, ACK/NACK information, scheduling information [SI], etc.). As another example, a pair of HS-SCCH orders can be reserved for commands that instruct the UE to activate or deactivate pilot and control channel signals on the additional carrier. In other examples, a combination of the foregoing or like commands can be implemented.

As a particular example to illustrate the foregoing, a set of HS-SCCH orders can be configured to instruct a UE to deactivate an additional carrier and a manner in which to do so. If battery consumption is a goal specified at the UE, a subset of HS-SCCH orders can instruct the UE to fully release the additional carrier, ending all overhead on that carrier. Otherwise, if no significant battery consumption goals are identified, the subset of orders can alternatively instruct the UE to ignore non-pilot and non-control signals on the additional carrier, reducing overhead but maintaining some utilization of that carrier. Likewise, a subset of HS-SCCH orders can be configured to instruct the UE to activate the additional carrier by simply monitoring downlink signaling on the carrier, or by both monitoring the downlink signaling and providing feedback on the carrier, depending on power consumption or processing overhead goals of the UE or a serving wireless access network.

The following is another example to illustrate multi-carrier control utilizing both higher layer orders (e.g., layer two or layer three orders) to enable an additional carrier (referred to as a secondary carrier in this example, although the number of additional carriers is not limited to one) and lower layer orders (e.g. layer two or physical layer orders) to rapidly activate or deactivate the additional carrier(s) as described above. This particular example employs layer two signaling (e.g., media access control—MAC—layer signaling) for scheduling and transport of high speed downlink shared channel (HS-DSCH) data to configure the UE on a primary carrier (e.g., see third generation partnership project [3GPP] TS 25.214 version 8.40—expressly incorporated in its entirety by reference herein—section 6A). For a secondary carrier (e.g., supported by a secondary HS-DSCH serving cell), a set of orders are established as follows:

Secondary_Cell_Enabled (values 0/1)—indicates whether higher layer protocols have enabled use of a secondary carrier for a UE.

Secondary_Cell_Active (values 0/1)—indicates whether lower layer protocols have activated or deactivated the secondary carrier for the UE.

Based on the above orders, if the UE is configured with a secondary serving carrier on a secondary HS-DSCH cell, then Secondary_Cell_Enabled is 1; otherwise Secondary_Cell_Enabled is 0 and Secondar_Cell_Active is 0 also. The secondary carrier is activated by the UE when an order setting Secondary_Cell_Enabled to 1 is sent to the UE. Once enabled, orders activated or deactivating the secondary carrier can be sent to the UE by issuing orders setting Secondary_Cell_Active to 1 or 0, respectively. According to some aspects of the subject disclosure, the UE is provided a specified time period (e.g., a predetermined number of time slots, such as 12 time slots) to activate or deactivate the secondary carrier after the end of an HS-SCCH subframe delivering an order.

To continue the foregoing example from the UE perspective, if Secondary_Cell_Active is set to 1, the UE can monitor an HS-SCCH set in a secondary serving HS-DSCH cell and receive HS-DSCH signaling scheduled in the secondary cell. The maximum size of a HS-SCCH set in a secondary serving HS-DSCH cell can be set to a predetermine number (e.g. 4), and a maximum number of HS-SCCH signals monitored by the UE across both the serving HS-DSCH cell and the secondary serving HS-DSCH cell is the combination of the number of serving and secondary cell orders (e.g., 6). In addition to the foregoing, the UE can be able to receive up to one HS-DSCH or HS-SCCH order from the serving HS-DSCH cell and up to one HS-DSCH or HS-SCCH order from the secondary serving HS-DSCH cell concurrently. In some aspects, types of signaling on the HS-DSCH transmissions can be limited as well. For instance, HS-DSCH transmission can be restricted from utilizing transmissions other than HS-SCCH signaling.

Various example bit mappings on a HS-DSCH can be employed to enable a secondary carrier, and activate or deactivate the secondary carrier. For instance, two bits can be reserved to enable and disable the secondary carrier via higher layer signaling (e.g., layer three or layer two signaling). In addition, one bit can be reserved to activate or deactivate the secondary carrier on lower layer signaling (e.g. physical layer signaling). As one example, see 3GPP TS 25.212 version 8.4.0, expressly incorporated in its entirety by reference herein, at 4.6C.2.1, and specifically 4.6C.2.2.1 and 4.6C.2.2.2. It should be appreciated that the subject disclosure and appended claims are not so limited however.

In at least one example of the subject disclosure, commands instructing a UE to activate/deactivate an allocated non-anchor carrier can be implemented via layer two MAC processing of DTX or DRX logic (e.g., see 3GPP TS 25.214 version 8.4.0 at section 6C). For instance, DTX/DRX commands can instruct a UE to monitor subframes of a wireless signal for activity. If activity occurs in those subframes, optionally over a certain number of subframes, the UE can be configured to take action in response. Where no activity occurs in those subframes over a certain number of subframes, another action can be taken. Furthermore, if no activity occurs within a second period of subframes, a third action can be taken, and so on. Thus, based on detected activity, the UE can activate a secondary carrier (e.g., previously allocated to the UE by higher layer protocols). If no activity occurs within a first number of subframes, the UE can be configured to turn off channel feedback (e.g. CQI, ACK/NACK, SI). If no activity occurs within the second period of subframes, the UE can be configured to terminate pilot channel or control channel processing on the secondary carrier. It should be appreciated that the foregoing is only one example of DTX/DRX logic that can be employed to provide implicit lower layer signaling commands to manage additional carriers for a UE. The subject disclosure and appended claims are not so limited, however.

Figure 2:
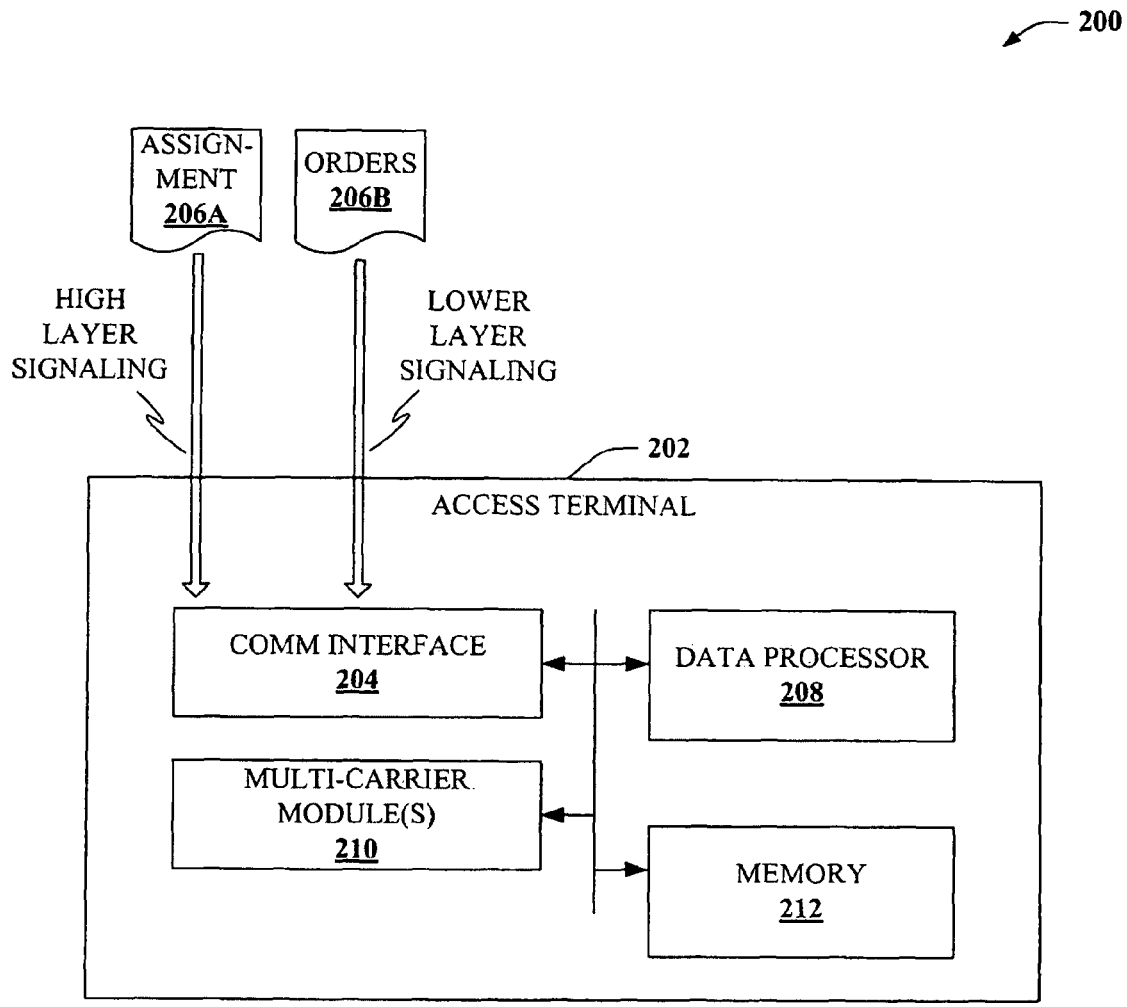
FIG. 2 depicts a block diagram of an example system that employs low layer carrier allocation in wireless communications.

Referring to FIG. 2, a block diagram of an example system 200 for implementing multi-carrier frequencies in wireless communications is depicted. System 200 can employ an anchor carrier of a wireless network as a default communication channel. Based on channel traffic requirements, system processing requirements, network loading, or the like, system 200 can be assigned a secondary carrier by the wireless network. Subsequently, control of the secondary carrier for optimizing the multi-carrier communication can be implemented by fast lower layer signaling commands. As a result, system 200 can be efficiently controlled in order to optimize throughput and data rates for high demand traffic, and reduce power consumption during periods of inactivity.

System 200 comprises an access terminal (AT) 202. AT 202 comprises a communication interface 204 for sending and receiving information. Specifically, communication interface 204 can comprise a wireless communication antenna and transceiver for transmitting and receiving wireless data. Furthermore, communication interface 204 can comprise a set of receivers for concurrent monitoring of signals received on a plurality of carrier frequencies (whether contiguous or non-contiguous in a wireless frequency spectrum). In addition, communication interface 204 can comprise a set of transmitters for sending a plurality of signals on uplink channels concurrently. This configuration enables AT 202 to employ multiple carriers simultaneously for increased throughput and traffic performance.

In operation, AT 202 obtains layer three signaling commands that enable multi-carrier operation (assignment 206A), and layer two or physical layer orders that provide dynamic, real-time or near real-time management of the multi-carrier operation (orders 206B). A data processor 208 can analyze received signals and execute a set of multi-carrier modules 210 (e.g., stored in memory 212) for implementing the multi-carrier management. The modules 210 can be configured to enable or disable a non-anchor carrier for AT 202, as well as activate and deactivate the non-anchor carrier based on commands received from a wireless network. Specifically, the multi-carrier modules 210 can activate/deactivate a carrier at least once every TTI, enabling fast management in response to network commands (based on, e.g., packet loss, traffic demand, power consumption requirements, etc.).

In some aspects of the subject disclosure, carrier activation/deactivation can comprise tiered functionality. For instance, at a first tier of activation (e.g. correlated with a first tier HS-SCCH command), one of the multi-carrier modules 210 can cause data processor 208 to analyze pilot signal, synchronization signal or control channel traffic on a non-anchor carrier. At a second tier, a module (210) can cause the data processor to implement channel feedback on the non-anchor carrier. At still other tiers of activation, a module (210) can cause the data processor to employ the non-anchor channel for uplink traffic services, or the like. Deactivation of the carrier can be implemented in inverse tiers. For example, tiered commands can cause the data processor to stop transmitting uplink data on the non-anchor carrier, stop transmitting feedback pertaining to the non-anchor carrier, and then stop monitoring pilot/synchronization/control channels of such carrier. The various tiered commands can be reserved as HS-SCCH orders, DTX/DRX logic orders, or the like, as discussed above.

By employing tiered activation/deactivation, system 200 can fine tune an amount of activity performed on the second carrier. Thus, by slowly scaling back activity on the second carrier, full re-activation of that carrier can be rapidly implemented to accommodate bursty traffic, for instance, or an improvement in path loss. As another benefit, different ratios of power consumption and carrier activity can be achieved, resulting in flexible wireless communications. It should be appreciated that the subject disclosure and appended claims are not limited to the foregoing example of tiered activation/deactivation, however. Rather, various other examples are contemplated, having either more tiers of activation/deactivation, or fewer (e.g. a single tier providing full activation/deactivation via a single pair of commands).

Figure 3:
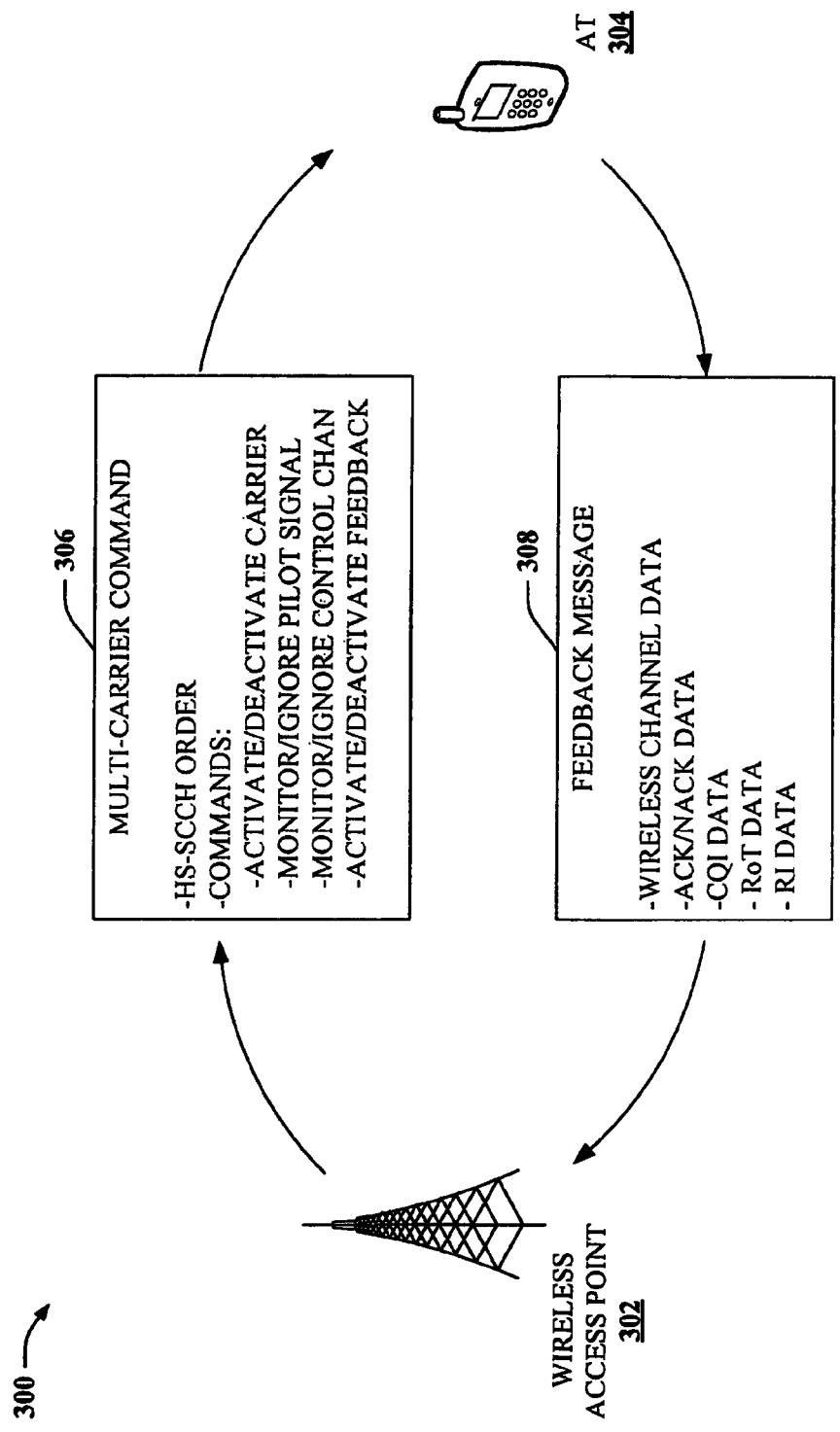
FIG. 3 depicts a block diagram of a sample system that employs feedback for multi-carrier allocation according to some aspects.

FIG. 3 illustrates a block diagram of an example system 300 according to additional aspects of the subject disclosure. Specifically, system 300 can implement network-managed multi-carrier communication for wireless terminals. Furthermore, the multi-carrier communication can involve activation or deactivation of a non-anchor carrier as fast as every TTI, providing rapid carrier control. Additionally, the managed communication can be based on feedback provided by AT 304. Accordingly, the access point 302 can send commands tailored to channel conditions as reported by AT 304, which can achieve significant adaptability in time-varying wireless conditions by implementing those commands.

Wireless access point 302 transmits a multi-carrier command 306. Multi-carrier command 306 can be transmitted over physical layer signaling protocols for high-speed transfer to AT 304. Command 306 can comprise instructions for implementation by AT 304. Specifically, such instructions can comprise an activation/deactivation command for a secondary carrier allocated to AT 304. In addition, the instructions can comprise a pilot signal monitor/ignore command or control channel monitor/ignore command pertaining to the secondary carrier. Moreover, command 306 can comprise a feedback activation/deactivation command, for instructing AT 304 to send wireless channel feedback pertaining to non-anchor carriers to customize carrier management for AT 304 as a function of the feedback.

AT 304 receives multi-carrier command 306 and implements instructions included therein. Specifically, in response to an activate feedback command, AT 304 can measure channel characteristics of a secondary carrier(s) and submit results of the measurements to a serving network. Measured channel characteristics can include packet loss, interference, multipath scattering, etc. Additionally, AT 304 can ACK/NACK packet transmission on the secondary carrier(s), provide SI data, and the like. Feedback generated by AT 304 is included in a feedback message 308, which is transmitted by AT 304 to wireless access point 302. Based on feedback data included in feedback message 308, network components coupled with wireless access point 302 (e.g., a multi-carrier management apparatus, see FIG. 1 at 102) can configure subsequent multi-carrier commands for current channel characteristics affecting AT 304. Additionally, the subsequent commands can be based on current traffic throughput requirements, quality of service (QoS) requirements, or network loading, as described herein.

Figure 4:
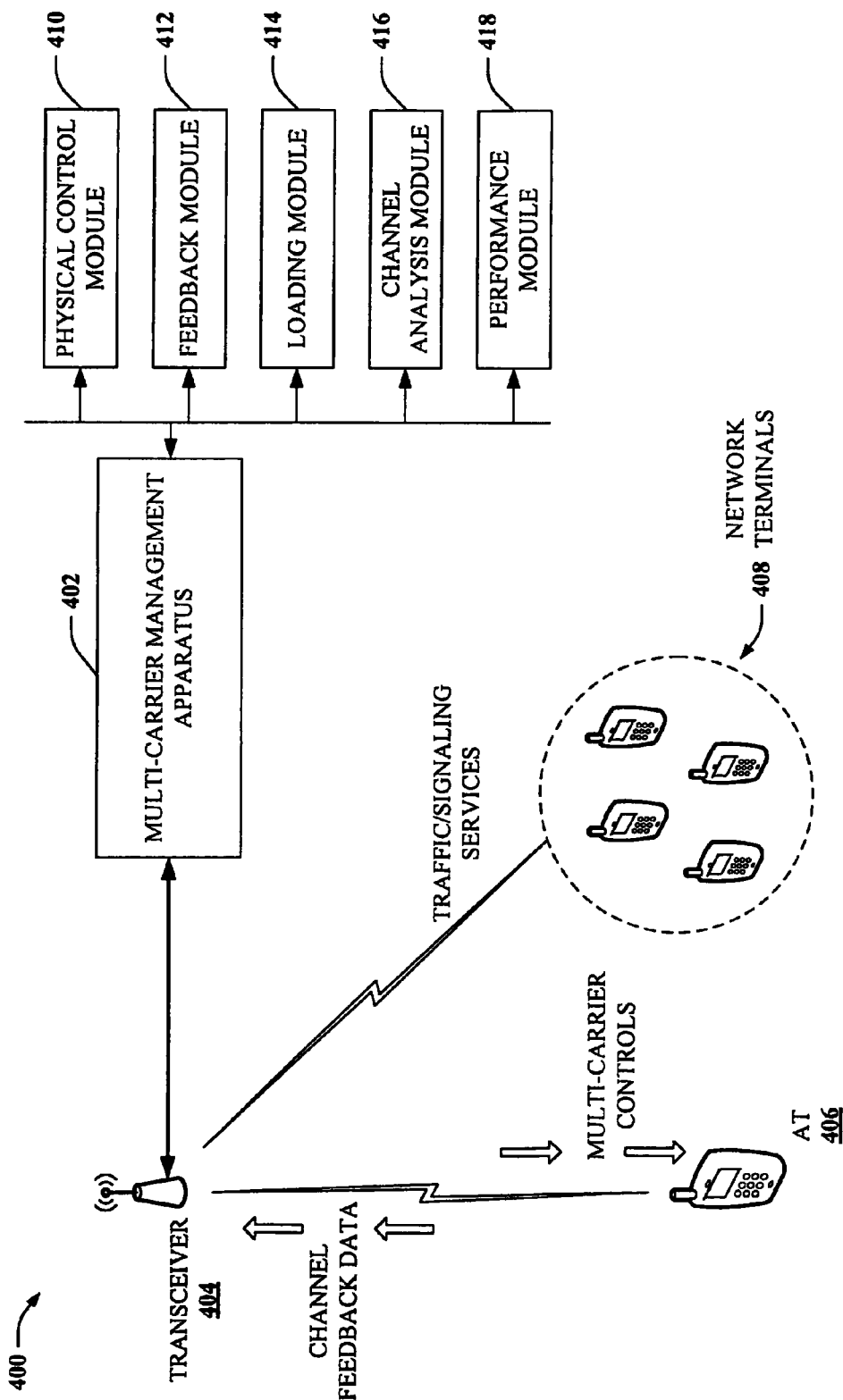
FIG. 4 illustrates a block diagram of an example system that controls carrier access based on system loading according to other aspects.

FIG. 4 depicts a block diagram of an example system 400 that provides multi-carrier management for terminals in a wireless network. System 400 can manage carrier allocation and activation based on wireless channel conditions within the wireless network. Furthermore, system 400 can also manage carrier activation based on network loading to provide efficient allocation of wireless network resources.

System 400 comprises a multi-carrier management apparatus 402 for generating carrier activation/deactivation commands for terminals 406, 408 of the wireless network. Specifically, apparatus 402 can employ a physical control module 410 that generates HS-SCCH orders for fast activation and deactivation of non-anchor carriers. The orders are transmitted by a transceiver 404 coupled with apparatus 402 to an AT 406 that is allocated one or more non-anchor carriers.

As described herein, selection of multi-carrier orders can be a function of a network condition. In some aspects of the subject disclosure, the network condition can be a characteristic of an anchor carrier or of a non-anchor carrier extracted by a feedback module 412 from data uploaded by ATs 406, 408. Feedback module 412 provides the characteristic (e.g., path loss, interference, scattering) for evaluation by a channel analysis module 416. Based on the wireless carrier characteristics, channel analysis module 416 determines whether AT 406 should activate or deactivate the non-anchor carrier, ACK/NACK packets transmitted on the non-anchor carrier, or the like. The determination is provided to multi-carrier analysis apparatus 402 for issuing a multi-carrier command to AT 406 consistent with the determination.

In other aspects of the subject disclosure, the network condition can comprise a current load on one or more wireless network channels. In such case, a loading module 414 can be employed by multi-carrier management apparatus 402 to evaluate network load. Specifically, loading module 414 can employ power or code usage on one or more carriers to establish downlink load. Alternatively, or in addition, loading module 414 can employ rise over thermal (RoT) information to establish uplink load. Based on the established network loading, loading module 414 can derive a suitable allocation of carriers to ATs 406, 408 served by multi-carrier apparatus 402. The allocation is sent to multi-carrier management apparatus 402 to generate orders instructing the ATs 406, 408 to activate specified carriers, as described herein.

According to further aspects of the subject disclosure, multi-carrier management for AT 406 can be based at least in part on a performance goal of AT 406. The performance goal can be provided by AT 406 to multi-carrier apparatus 402, or stored in a network data store (not depicted, but see FIG. 5, infra) and associated with AT 406 or a user profile thereof. Example performance goals can comprise AT power consumption, AT traffic performance, such as throughput or data rate, or the like. Performance module 418 evaluates the goal in comparison with current traffic requirements of the AT. Where accomplishing the goal requires releasing a non-anchor carrier (e.g. for preserving battery power), performance module 418 can cause multi-carrier management apparatus 402 to issue a carrier deactivation order and submit the order to AT 406. Where accomplishing the goal requires activating the non-anchor carrier (e.g. to meet traffic requirements), performance module 418 can cause multi-carrier management apparatus to issue a carrier activation order and submit this order to AT 406. Performance module 418 can further be configured to balance competing requirements based on the performance goal and current conditions at AT 406 (e.g. extracted by feedback module 412). As one example, if traffic requirements demand high throughput, but current battery power of AT 406 drops below a threshold level, performance module 418 can give precedence to power consumption over traffic requirements, and cause a carrier deactivation or release order be sent to AT 406. It should be appreciated that the subject disclosure and appended claims are not limited to the foregoing example, however. Rather, performance module 418 can be configured to determine precedence in other examples of conflict between traffic requirements and AT performance goals.

Figure 5:
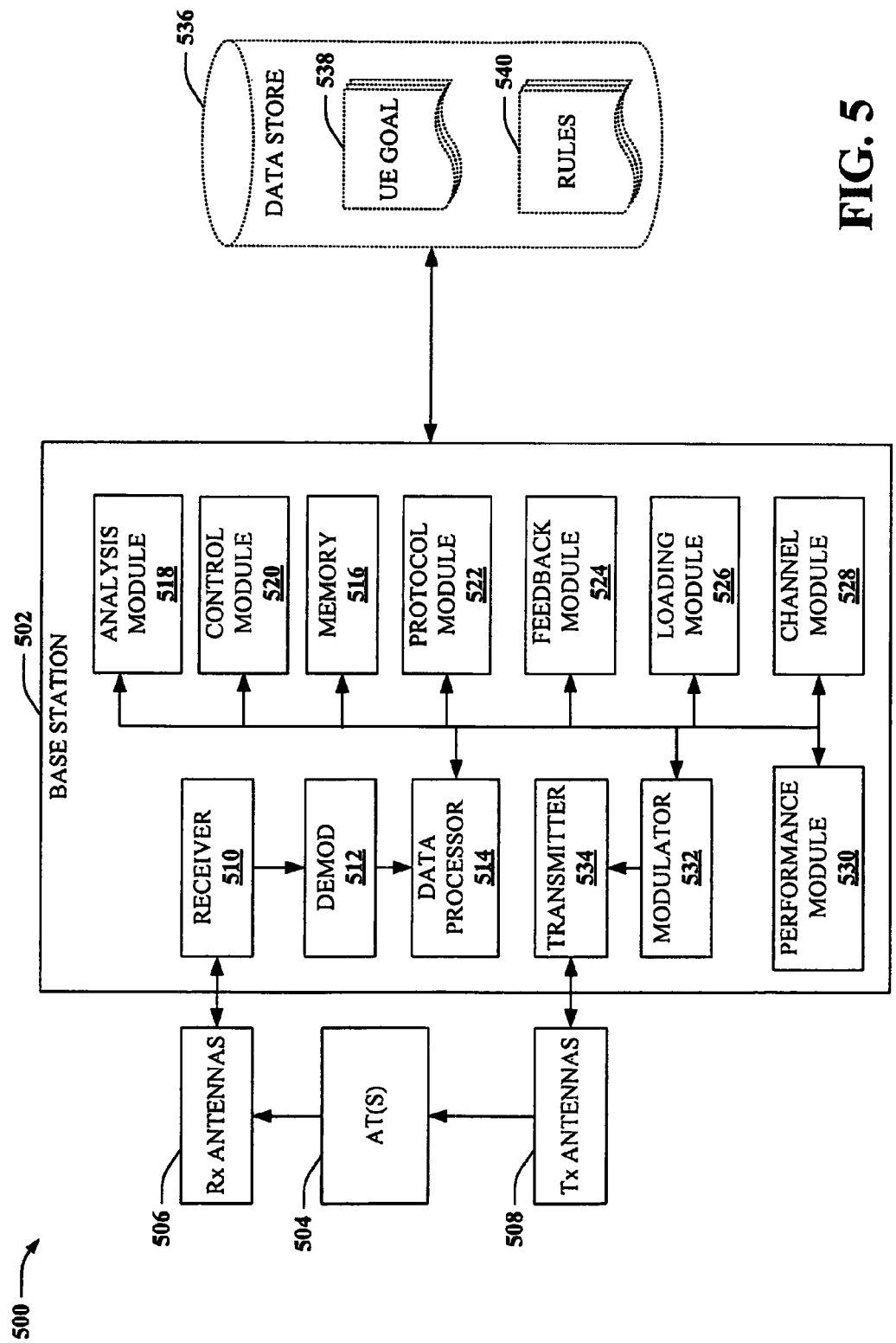
FIG. 5 depicts a block diagram of an example system comprising a base station configured for fast carrier allocation.

FIG. 5 illustrates a block diagram of an example system 500 for high-speed network-managed multi-carrier communication in a wireless communication environment. Specifically, system 500 can comprise a base station 502 configured to generate layer two or physical layer commands for managing multi-carrier communication for one or more ATs 504 served by base station 502. Furthermore, the commands can be generated based on prevailing wireless conditions at the ATs 504, or current network load, to provide efficient multi-carrier operation and carrier allocation for a wireless network.

Base station 502 (e.g., access point, . . . ) can comprise a receiver 510 that obtains wireless signals from one or more of ATs 504 through one or more receive antennas 506, and a transmitter 534 that sends coded/modulated wireless signals provided by modulator 532 to the AT(s) 504 through a transmit antenna(s) 508. Receiver 510 can obtain information from receive antennas 506 and can further comprise a signal recipient (not shown) that receives uplink data transmitted by AT(s) 504. Additionally, receiver 510 is operatively associated with a demodulator 512 that demodulates received information. Demodulated symbols are analyzed by a data processor 514. Data processor 514 is coupled to a memory 516 that stores information related to functions provided or implemented by base station 502. In one instance, stored information can comprise rules or protocols for analyzing network channel characteristics or network load, and generating multi-carrier commands to efficiently allocate carriers to AT(s) 504. Further to the above, data processor 514 can be coupled to a data store 536 that stores rules 540 for generating the commands based on the channel characteristics or network load. In at least one aspect of the subject disclosure, the data store 534 can further store performance goals for the AT(s) 504 and generate the commands in accordance with the goals.

Base station 502 can further comprise an analysis module 518 that analyzes wireless channel conditions (e.g., RoT, network loading) employed by AT(s) 504, or evaluates wireless channel conditions reported by AT(s) 504 (e.g., via CQI or SI transmissions), and received at a feedback module 524. Evaluation can comprise identifying path loss, multi-path scattering, interference or the like on one or more carriers allocated to a reporting AT 504. The evaluated condition is submitted to a control module 520, which references a set of multi-carrier allocation rules 540 for generating carrier management orders for AT(s) 504. Specifically, control module 520 can employ a channel analysis module 528 to establish threshold throughput, data rate or like conditions for optimal multi-carrier performance. Channel analysis module 528 can determine a significance of the evaluated condition and identify a suitable action to be taken by the AT(s) 504 with respect to the allocated carrier(s). Optionally, the suitable action can reflect a performance goal (538) of AT 504, obtained and analyzed by a performance module 530 and stored in data store 536. Control module 520 employs a physical protocol module 522 to generate an HS-SCCH order or DTX/DRX order instructing AT(s) 504 to implement the identified action. Alternatively, or in addition, the suitable action can be based on current network load determined by a loading module 526. For instance, where network load is high, the order can instruct AT(s) 504 to deactivate or release non-anchor carriers, enabling base station 502 to serve a greater number of ATs (504). Conversely, where network load is moderate or low, the order can instruct AT(s) 504 to activate a non-anchor carrier to achieve increased performance.

Figure 6:
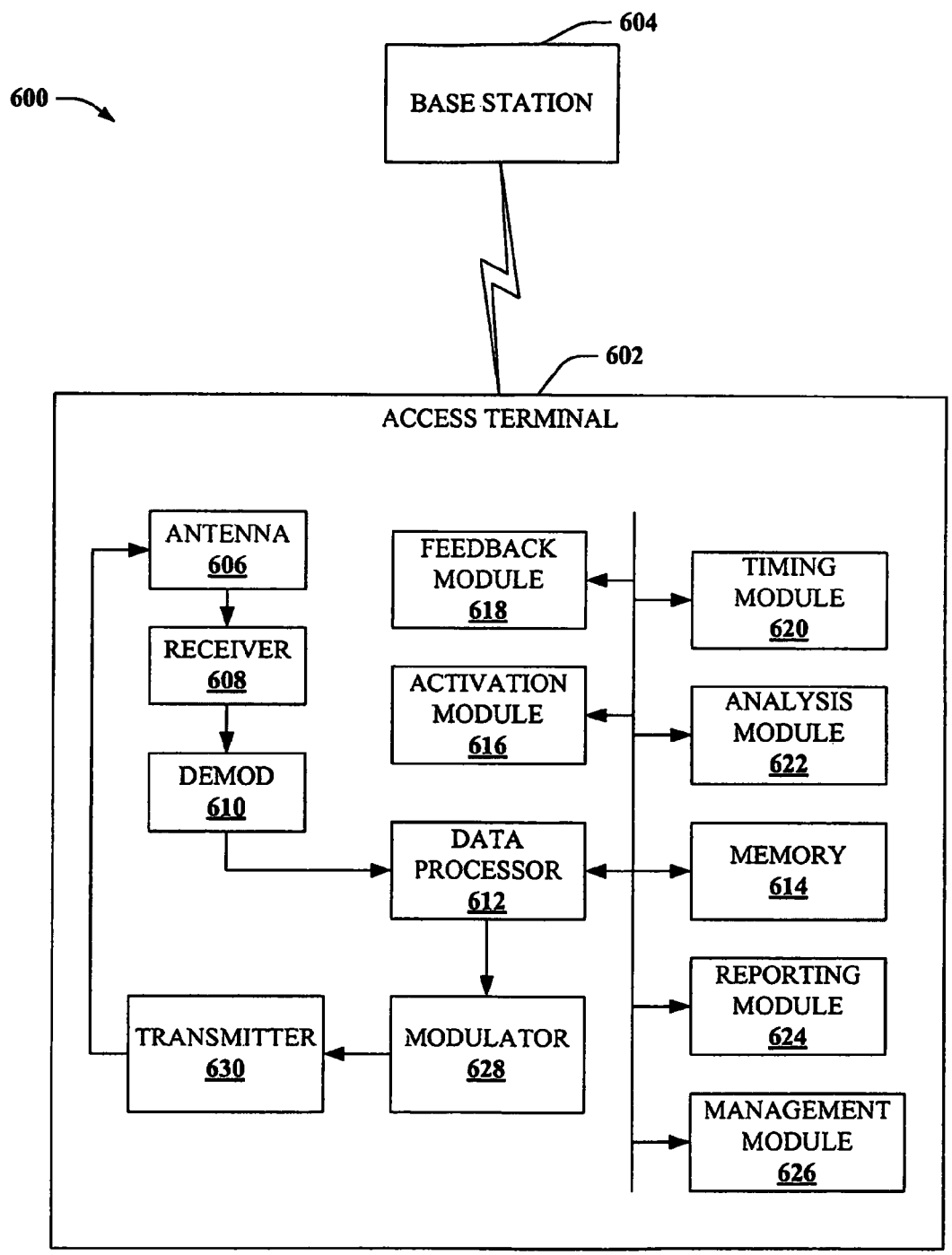
FIG. 6 depicts a block diagram of a sample UE that employs lower layer commands for multi-carrier management.

FIG. 6 depicts a block diagram of an example system 600 comprising an AT 602 configured for wireless communication according to aspects of the subject disclosure. AT 602 can be configured to wirelessly couple with one or more base stations 604 (e.g., access point) of a wireless network. Based on such configuration, AT 602 can receive wireless signals from a base station (504) on a forward link channel and respond with wireless signals on a reverse link channel. In addition, AT 602 can comprise instructions stored in memory 614 for analyzing received wireless signals, extracting multi-carrier management orders from the analyzed signals and implementing those instructions, or the like, as described herein.

AT 602 includes at least one antenna 606 (e.g. a wireless transmission/reception interface or group of such interfaces comprising an input/output interface) that receives a signal and receiver(s) 608, which performs typical actions (e.g., filters, amplifies, down-converts, etc.) on the received signal. In general, antenna 606 and a transmitter 630 (collectively referred to as a transceiver) can be configured to facilitate wireless data exchange with base station(s) 604.

Antenna 606 and receiver(s) 608 can also be coupled with a demodulator 610 that can demodulate received symbols and provide such signals to a data processor(s) 612 for evaluation. Data processor(s) 612 then provides such signals to modulator 628. It should be appreciated that data processor(s) 612 can control and/or reference one or more components (606, 608, 610, 614, 616, 618, 620, 622, 624, 626, 628) of the AT 602. Further, data processor(s) 612 can execute one or more modules, applications, engines, or the like (616, 618, 620, 622, 624, 626) that comprise information or controls pertinent to executing functions of the AT 602. For instance, such functions can include activating/deactivating multiple carriers, monitoring pilot, synchronization and control channels of such carriers, providing channel analysis or packet reliability data pertaining to the carriers, or receiving traffic data on the carriers, as described herein.

Additionally, memory 614 of AT 602 is operatively coupled to data processor(s) 612. Memory 614 can store data to be transmitted, received, and the like, and instructions suitable to conduct wireless communication with a remote device (604). Specifically, the instructions can be utilized to implement the various functions described above, or elsewhere herein. Further, memory 614 can store the modules, applications, engines, etc. (616, 618, 620, 622, 624, 626) executed by data processor(s) 612, above.

Additionally, AT 602 can comprise an activation module 616 configured to initiate or deactivate non-anchor carriers allocated to AT 602, in response to a suitable multi-carrier command received by AT 602 and decoded by an analysis module 622. Activation can comprise monitoring pilot/control channels, employing a feedback module 618 to provide CQI, SI, or ACK/NACK data pertaining to the carriers, or receiving traffic on the carriers, or a combination thereof. Furthermore, deactivation can comprise employing feedback module 618 to terminate channel or packet reporting pertaining to the carriers, or ignoring traffic data or pilot/control signaling transmitted on the carriers, or a combination thereof.

In at least one aspect of the subject disclosure, multi-carrier commands received by AT 602 can be implemented for a particular time period. A timing module 620 can initiate a counter for tracking the time period upon such a command being processed by data processor 612. If the data processor 612 analyzes a subsequent multi-carrier command within the time period, the subsequent command can be implemented. Otherwise, data processor 612 can return AT 602 to a default single carrier state or to a multi-carrier state prior to receiving the command on which the timer was set. In the latter case, data processor 612 can store prior state information in memory 614, which can be utilized to restore the prior state.

Further to the above, AT 602 can comprise a reporting module 624 configured to submit channel quality information to base station 604. The channel quality information can be submitted as CQI, SI, or the like, indicating a current state of wireless channel characteristics observed by AT 602. Reporting module 624 can trigger data submission periodically, or upon receipt of a feedback command from base station 604.

In at least one aspect of the subject disclosure, AT 602 can comprise a management module 626 that maintains an operation or performance goal for AT 602 pertinent to multi-carrier communication. The operation/performance goal can specify an importance hierarchy for a set of operational parameters of AT 602. The parameters can include power consumption, battery power level, traffic throughput or data rate, wireless channel quality, or the like. Additionally, the importance hierarchy can establish which operational parameters take precedence when a conflict between parameters results. An example conflict can include conserving battery life while participating in high quality, high data rate traffic on multiple carriers. Resolution of the conflict can be established at least in part on the importance hierarchy. E.g., if battery life takes precedence, power consumption can be maintained at a relatively low maximum threshold, despite adverse effects on traffic data rate. In at least one aspect, of the subject disclosure, the hierarchy can be implemented on one or more conditions, or different importance hierarchies can be established for different operating states of AT 602. For instance, an importance hierarchy can specify that traffic throughput has higher precedence over power consumption, on condition that a battery power is at least half full. Likewise, a first importance hierarchy can be established when AT 602 is operating on AC power (e.g., plugged into an external power supply), and a second importance hierarchy can be established when AT 602 is operating on battery power. The subject disclosure and appended claims are not limited to the foregoing examples, however.

Management module 626 can convey performance goal, importance hierarchy or AT state information to base station 602. Changes in AT state or operational characteristics pertinent to one or more importance conditions (e.g., current battery power) can also be conveyed to base station 602. Accordingly, the base station 602 can manage multi-carrier communication at AT 602 in accordance with specified goals, conditions and states of the AT 602. Additionally, it should be appreciated that performance/operational goals, importance hierarchies, conditions or AT state can be specified and updated by a user through a user interface of AT 602 (not depicted), or can be default settings stored in memory 614.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include AT 602, base station 502, data store 536 and multi-carrier management apparatus 102, or a different combination of these or other components. Sub-components could also be implemented as components communicatively coupled to other components rather than included within parent components. Additionally, it should be noted that one or more components could be combined into a single component providing aggregate functionality. For instance, analysis module 110 can include control module 112, or vice versa, to facilitate analyzing wireless channel conditions and generating multi-carrier commands based on those conditions by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . . Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 7:
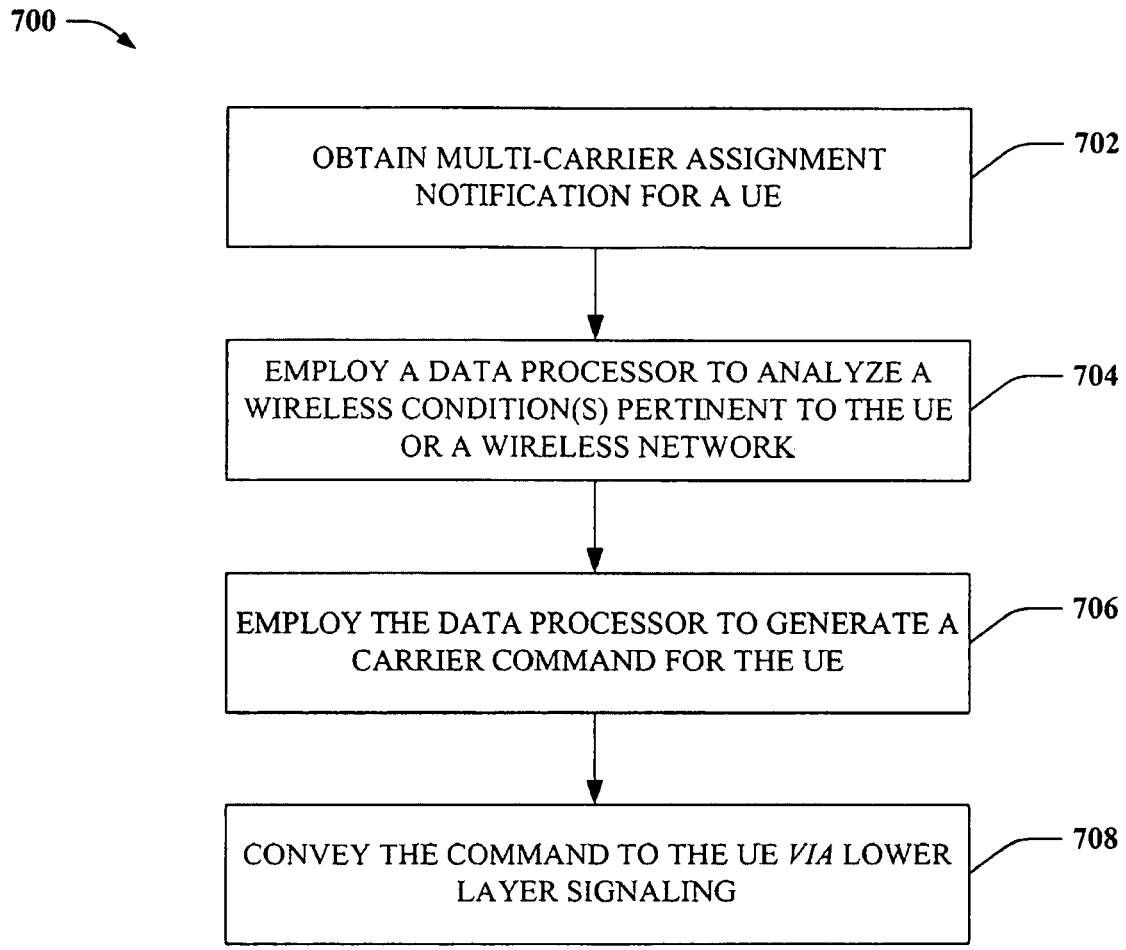
FIG. 7 illustrates a flowchart of an example methodology for providing fast carrier allocation according to further aspects.

FIG. 7 illustrates a flowchart of an example methodology 700 for carrier management in a wireless communication environment. At 702, method 700 can obtain an assignment of multiple frequency carriers for a UE in a wireless network. The assignment can be sent by a network component, such as an RNC, or can be transmitted by the UE. Additionally, the assignment of multiple frequency carriers can be processed using higher layer signaling protocol instructions (e.g., layer three protocol).

At 704, method 700 can employ a data processor to analyze a wireless condition pertinent to the UE or pertinent to a wireless network. In some aspects of the subject disclosure, the wireless condition can comprise a wireless channel quality or performance measurement. Such measurement can be conducted by the UE and submitted as channel feedback information (e.g., CQI, SI, RoT, ACK/NACK, etc.). Alternatively, the wireless condition can comprise a network loading measurement conducted by a network component.

At 706, method 700 can employ the data processor to generate a carrier command for the UE. The carrier command can comprise a management order, instructing the UE to take one or more actions with respect to a non-anchor carrier allocated to the UE by the multi-carrier assignment. Furthermore, the carrier command can be processed based on lower layer signaling protocols. In one example, the carrier command can be processed based on DTX or DRX logic. For instance, a command instructing the UE to activate the non-anchor carrier can be sent within a specified subframe or range of subframes of a DTX/DRX cycle. Alternatively, or in addition, a command instructing the UE to deactivate the non-anchor carrier can comprise refraining from signaling within the specified subframe or range of subframes of the DTX/DRX cycle. As another example, the carrier command can comprise a physical layer order composed of HS-SCCH transmissions correlated to specific non-anchor carrier activities conducted by the UE. In either case, method 700 can convey the carrier command to the UE at 708. As described, method 700 enables high speed control of multi-carrier configurations at the UE, by employing high speed lower layer signaling. Thus, dynamic activation/deactivation of the non-anchor carrier, activation/deactivation of channel feedback, and so forth, can be implemented based on time-varying conditions observed by the UE.

Figure 8:
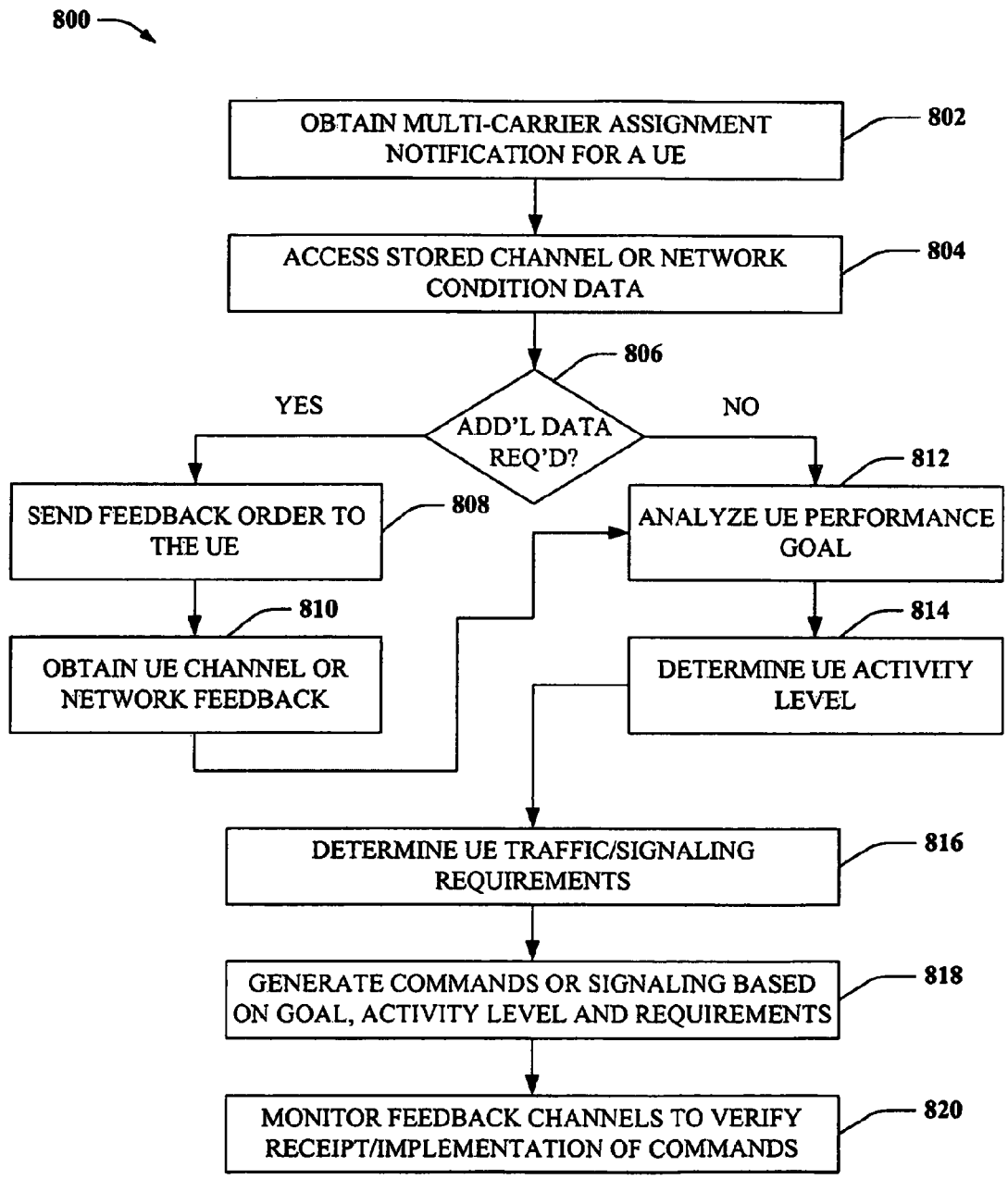
FIG. 8 depicts a flowchart of an example methodology for multi layer signaling for network-directed carrier management.

FIG. 8 depicts a flowchart of an example methodology 800 for providing network-managed multi-carrier configurations for UEs in a wireless network. At 802, method 800 can obtain a multi-carrier assignment notification for a UE, as described herein. At 804, method 800 can access stored channel or network condition information pertinent to the UE, or pertinent to a network serving the UE. At 806, a determination is made as to whether additional data is required for multi-carrier management, in lieu of or in addition to the stored information. If additional data is required to implement the multi-carrier management, method 800 can proceed to 808; otherwise method 800 proceeds to 812.

At 808, method 800 can issue a feedback order to the UE, requesting the additional information. Such information can comprise, for instance, wireless channel characteristics pertinent to a channel carrier allocated to the UE. At 810, method 800 can obtain channel or network-related feedback information from the UE (e.g., on an uplink channel employed by the UE for submitting feedback data). At 812, method 800 can analyze a performance goal of the UE. At 814, method 800 can determine a suitable activity level (e.g., processing overhead, power consumption level) for the UE, based at least in part on the performance goal. Additionally, at 816, method 800 can determine suitable traffic or signaling requirements for the UE, based on QoS requirements for instance, as well as current network load compared with an optimal or desired load threshold. At 818, method 800 can generate lower layer commands instructing the UE to take one or more actions pertinent to multi-carrier communication, and transmit the commands via physical layer signaling to the UE. At 820, method 800 can monitor feedback channels employed by the UE to verify receipt/implementation of the commands. If one or more commands are NACKed by the UE, method 800 can resend those commands to the UE. Alternatively, where feedback at the UE is disabled for multi-carrier commands, a default number of command retransmissions can be implemented, to increase likelihood of receipt at the UE.

Figure 9:
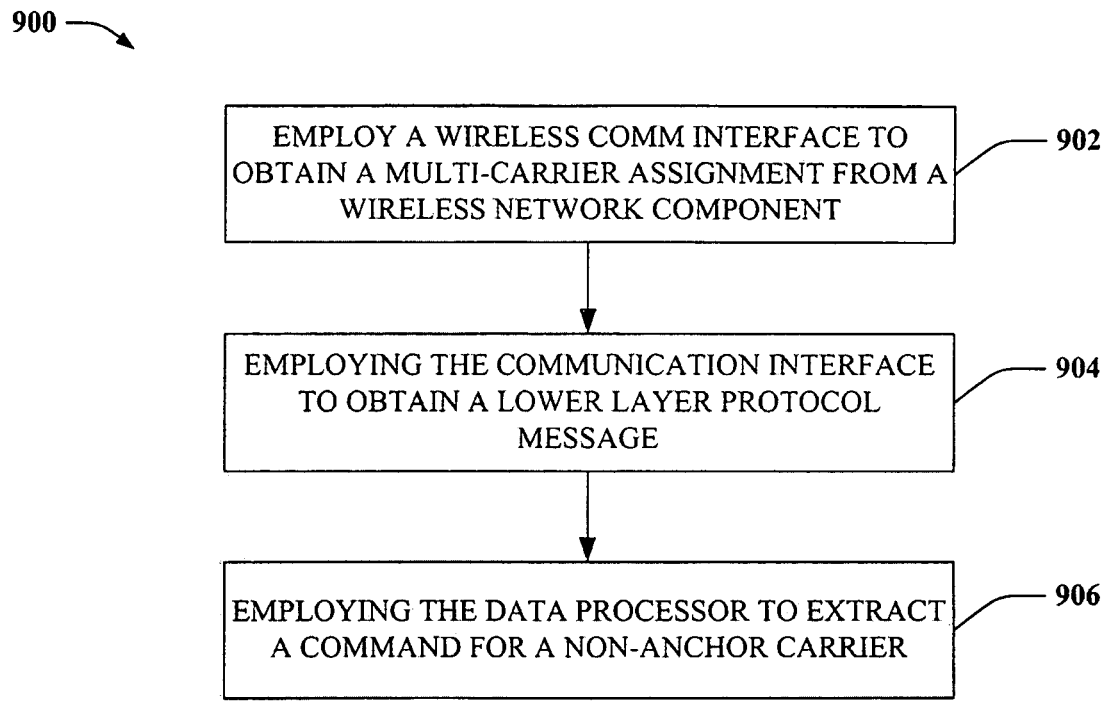
FIG. 9 illustrates a flowchart of an example methodology for multi-carrier allocation management according to aspects disclosed herein.

FIG. 9 illustrates a flowchart of a sample methodology 900 for utilizing network-managed multi-carrier configurations in wireless communications. At 902, method 900 can employ a wireless communication interface to obtain a multi-carrier assignment from a wireless network component. The multi-carrier assignment can be generated and transmitted on higher layer signaling protocols, such as layer three protocols. Furthermore, at 904, method 900 can employ the communication interface to obtain a lower layer protocol message pertinent to managing the multi-carrier assignment. The lower layer protocol message can be a DTX/DRX cycle transmission or an HS-SCCH transmission, for instance. At 906, method 900 can employ a data processor to extract a command for a non-anchor carrier specified by the multi-carrier assignment. In some aspects of the subject disclosure, the command can include an activation/deactivation order for the non-anchor carrier. In other aspects, the command can include a feedback activation/deactivation order. The order can be implemented to facilitate the network-managed multi-carrier configurations. Optionally, receipt of the command can be ACKed to further facilitate efficient wireless signaling depending on whether feedback is activated.

Figure 10:
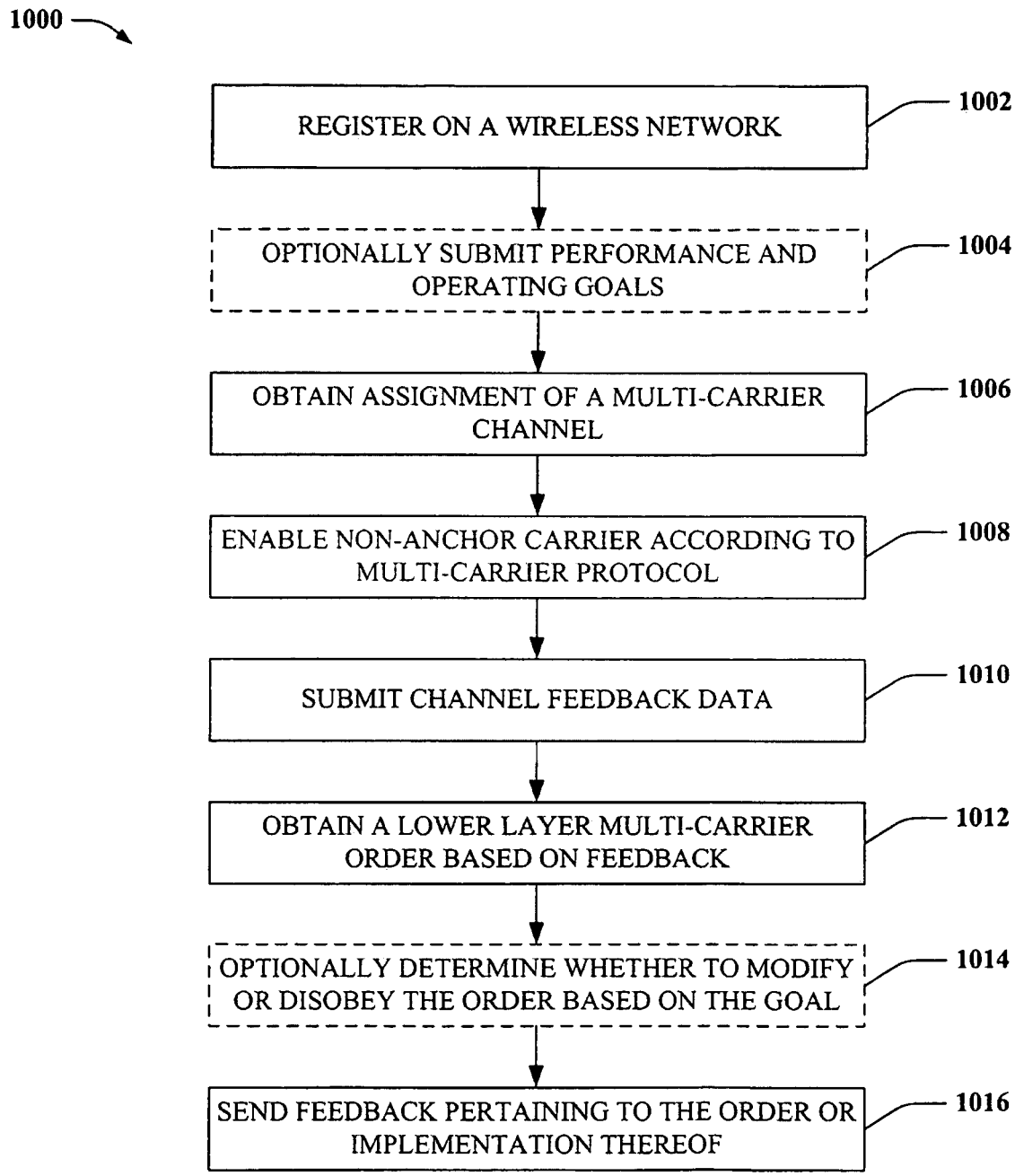
FIG. 10 depicts a flowchart of a sample methodology for employing multi-layer signaling for multi-carrier utilization.

FIG. 10 illustrates a flowchart of an example methodology 1000 for participating in wireless communications in a wireless environment. At 1002, method 1000 can register a UE with a wireless network. At 1004, method 1000 can optionally submit performance and operating goals pursuant to multi-carrier wireless operation. At 1006, method 1000 can obtain an assignment of a multi-carrier channel or set of channels. At 1008, method 1000 can enable a non-anchor carrier in response to the assignment according to a multi-carrier protocol. At 1010, method 1000 can submit channel feedback data pertaining at least in part to the non-anchor carrier. At 1012, method 1000 can obtain a lower layer multi-carrier order based at least in part on the feedback. At 1014, method 1000 can optionally determine whether to modify or disobey the order based on the performance and operating goals. The determination can depend on a current state of a UE operating within the wireless environment, or based on current channel conditions observed by the UE, or current traffic requirements of the UE. Based on the determination, the order can be implemented as-is, implemented as-modified, or not implemented. At 1016, a response can optionally be sent to a network issuing the command detailing the implementation, modification or repudiation of the command.

Figure 11:
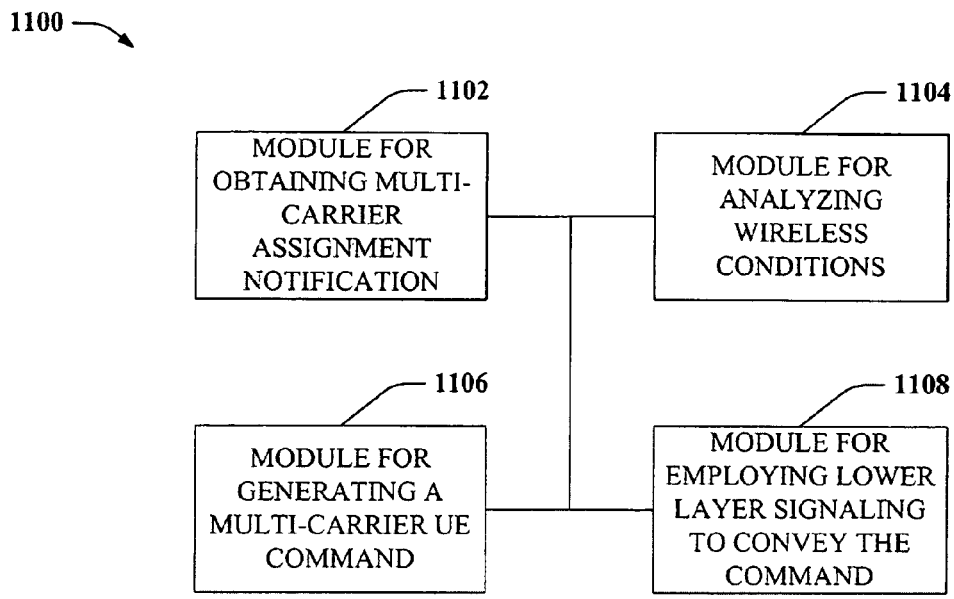
FIGS. 11 and 12 depict block diagrams of example systems dynamic carrier allocation in multi-carrier communications.
Figure 12:
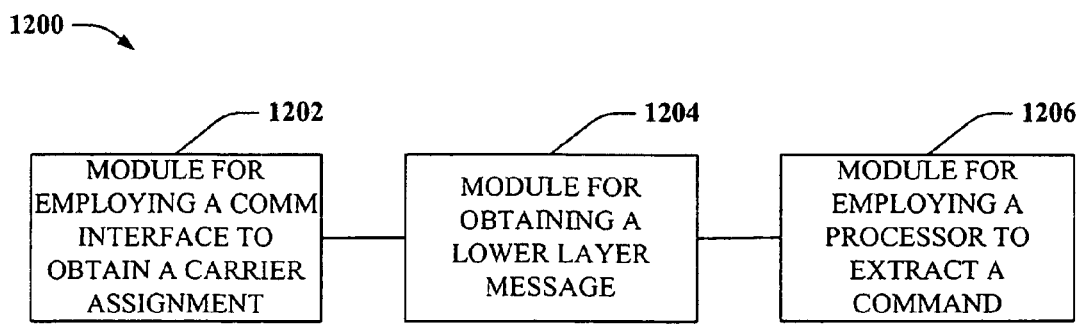

FIGS. 11 and 12 depict block diagrams of example systems 1100, 1200 for implementing high-speed multi-carrier management in a wireless communications environment, according to aspects of the subject disclosure. For example, systems 1100 and 1200 can reside at least partially within a wireless communication network and/or within a transmitter such as a node, base station, access point, user terminal, personal computer coupled with a mobile interface card, or the like. It is to be appreciated that systems 1100 and 1200 are represented as including functional blocks, which can be functional blocks that represent functions implemented by a processor, software, or combination thereof (e.g., firmware).

System 1100 can comprise a module 1102 for obtaining a multi-carrier assignment notification for a UE. The module 1102 can comprise a wired or wireless communication interface, coupled with a network component responsible for multi-carrier assignment, or coupled wirelessly with the UE. In addition, system 1100 can comprise a module 1104 for analyzing wireless conditions pertinent to the UE or to a serving wireless network. In the former case, the wireless conditions can comprise channel quality or performance characteristics, such as packet loss, throughput or data rate. In the latter case, wireless conditions can comprise network loading conditions. Further to the above, system 1100 can comprise a module 1106 for generating a multi-carrier UE command, based on the analyzed wireless conditions. A module 1108 for employing lower layer signaling can be utilized to convey the command to the UE for implementation.

System 1200 can comprise a module 1202 for employing a wireless communication interface to obtain a multi-carrier assignment from a wireless network component. The assignment can allocate a non-anchor carrier to system 1200, in addition to an anchor carrier assigned to system 1200. It should be appreciated that the anchor carrier and non-anchor carrier need not be contiguous in frequency. System 1200 can further comprise a module 1204 for employing the communication interface to obtain a lower layer signaling message. The lower layer message can be configured or conveyed according to layer two signaling protocols, or physical layer protocols, as described herein. Additionally, system 1200 can comprise a module 1206 for employing a data processor to extract a command pertaining to the non-anchor carrier of the multi-carrier assignment. The command can optionally be based on channel conditions submitted by system 1200. Alternatively, or in addition, the command can be based on operational or performance goals of system 1200, facilitating a desired state of system 1200 for wireless communications.

Figure 13:
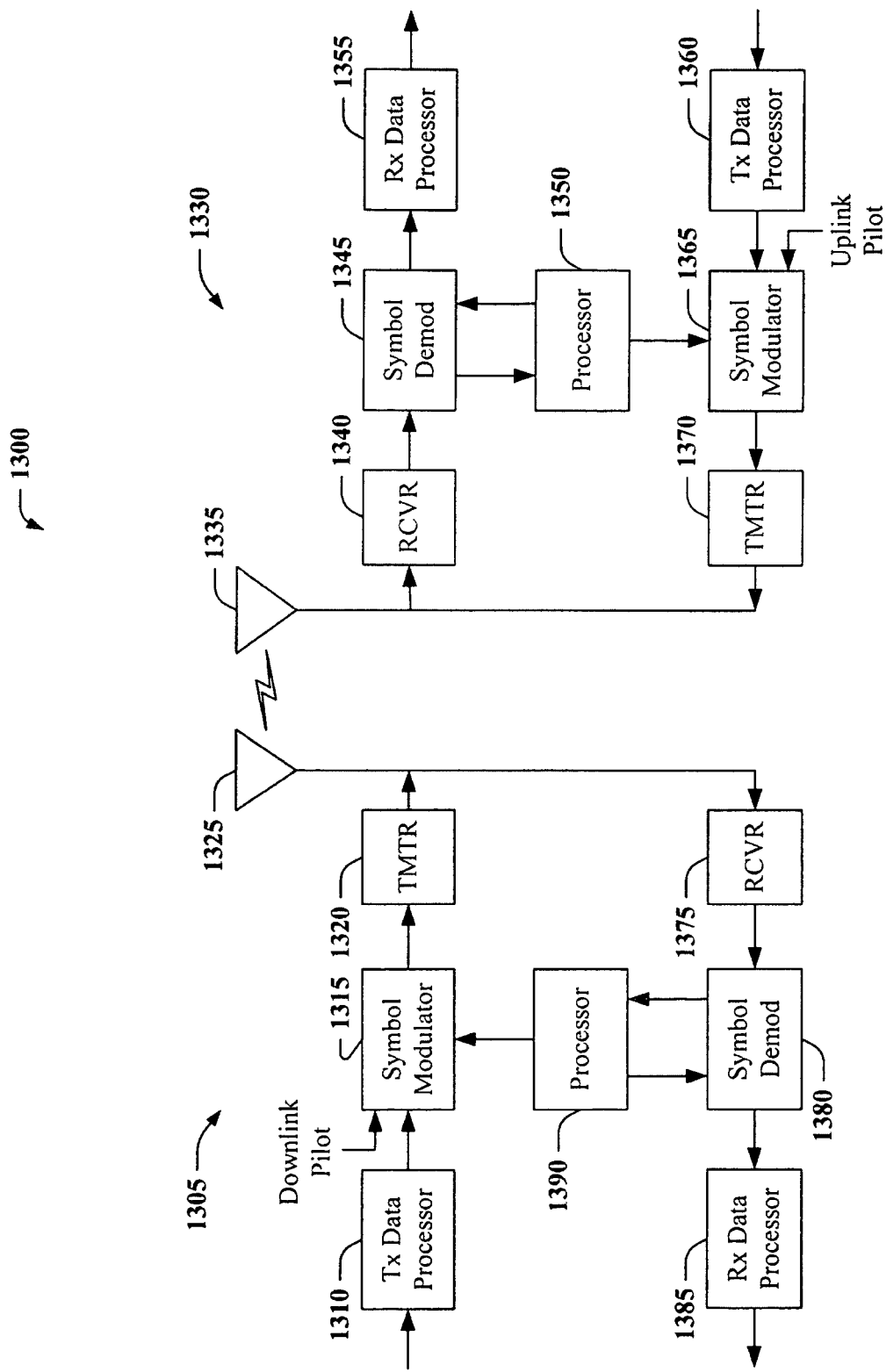
FIG. 13 illustrates a block diagram of a sample wireless communication apparatus according to aspects disclosed herein.

FIG. 13 depicts a block diagram of an example system 1300 that can facilitate wireless communication according to some aspects disclosed herein. On a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1320 multiplexes data and pilot symbols and provides them to a transmitter unit (TMTR) 1320. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1320 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305. Specifically, the uplink signal can be in accordance with SC-FDMA requirements and can include frequency hopping mechanisms as described herein.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals can transmit pilot concurrently on the uplink on their respective assigned sets of pilot subbands, where the pilot subband sets can be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1390 and 1350.

Figure 14:
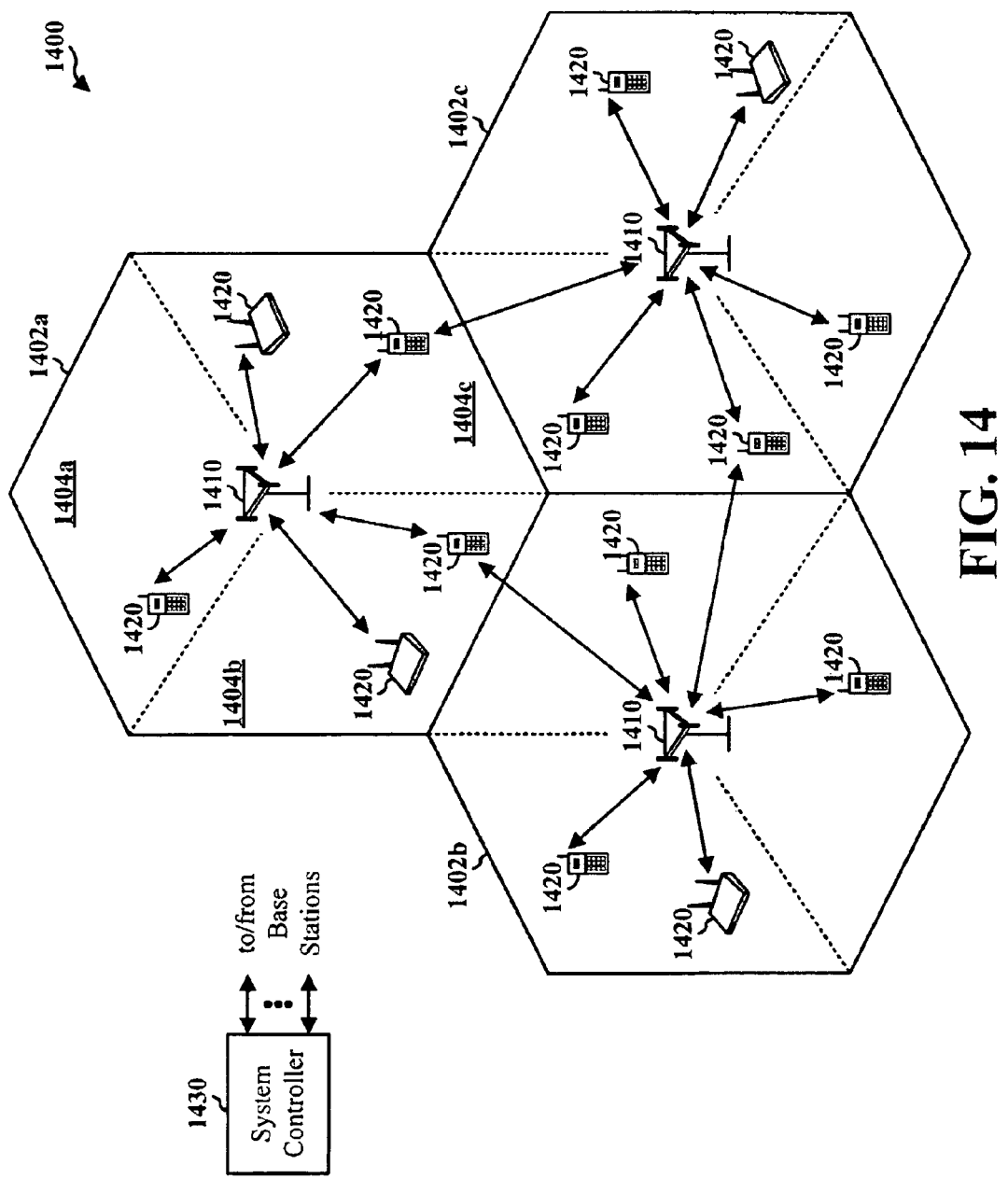
FIG. 14 illustrates a block diagram of a sample cellular environment for communication between wireless devices.

FIG. 14 illustrates a wireless communication system 1400 with multiple base stations (BSs) 1410 (e.g., wireless access points, wireless communication apparatus) and multiple terminals 1420 (e.g., ATs), such as can be utilized in conjunction with one or more aspects. A BS (1410) is generally a fixed station that communicates with the terminals and can also be called an access point, a Node B, or some other terminology. Each BS 1410 provides communication coverage for a particular geographic area or coverage area, illustrated as three geographic areas in FIG. 14, labeled 1402a, 1402b, and 1402c. The term "cell" can refer to a BS or its coverage area depending on the context in which the term is used. To improve system capacity, a BS geographic area/coverage area can be partitioned into multiple smaller areas (e.g., three smaller areas, according to cell 1402a in FIG. 14), 1404a, 1404b, and 1404c. Each smaller area (1404a, 1404b, 1404c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with unsectorized cells. For simplicity, in the subject description, unless specified otherwise, the term "base station" is used generically for a fixed station that serves a sector as well as a fixed station that serves a cell.

Terminals 1420 are typically dispersed throughout the system, and each terminal 1420 can be fixed or mobile. Terminals 1420 can also be called a mobile station, user equipment, a user device, wireless communication apparatus, an access terminal, a user terminal or some other terminology. A terminal 1420 can be a wireless device, a cellular phone, a personal digital assistant (PDA), a wireless modem card, and so on. Each terminal 1420 can communicate with zero, one, or multiple BSs 1410 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1430 couples to base stations 1410 and provides coordination and control for BSs 1410. For a distributed architecture, BSs 1410 can communicate with one another as needed (e.g., by way of a wired or wireless backhaul network communicatively coupling the BSs 1410). Data transmission on the forward link often occurs from one access point to one access terminal at or near the maximum data rate that can be supported by the forward link or the communication system. Additional channels of the forward link (e.g. control channel) can be transmitted from multiple access points to one access terminal. Reverse link data communication can occur from one access terminal to one or more access points.

Figure 15:
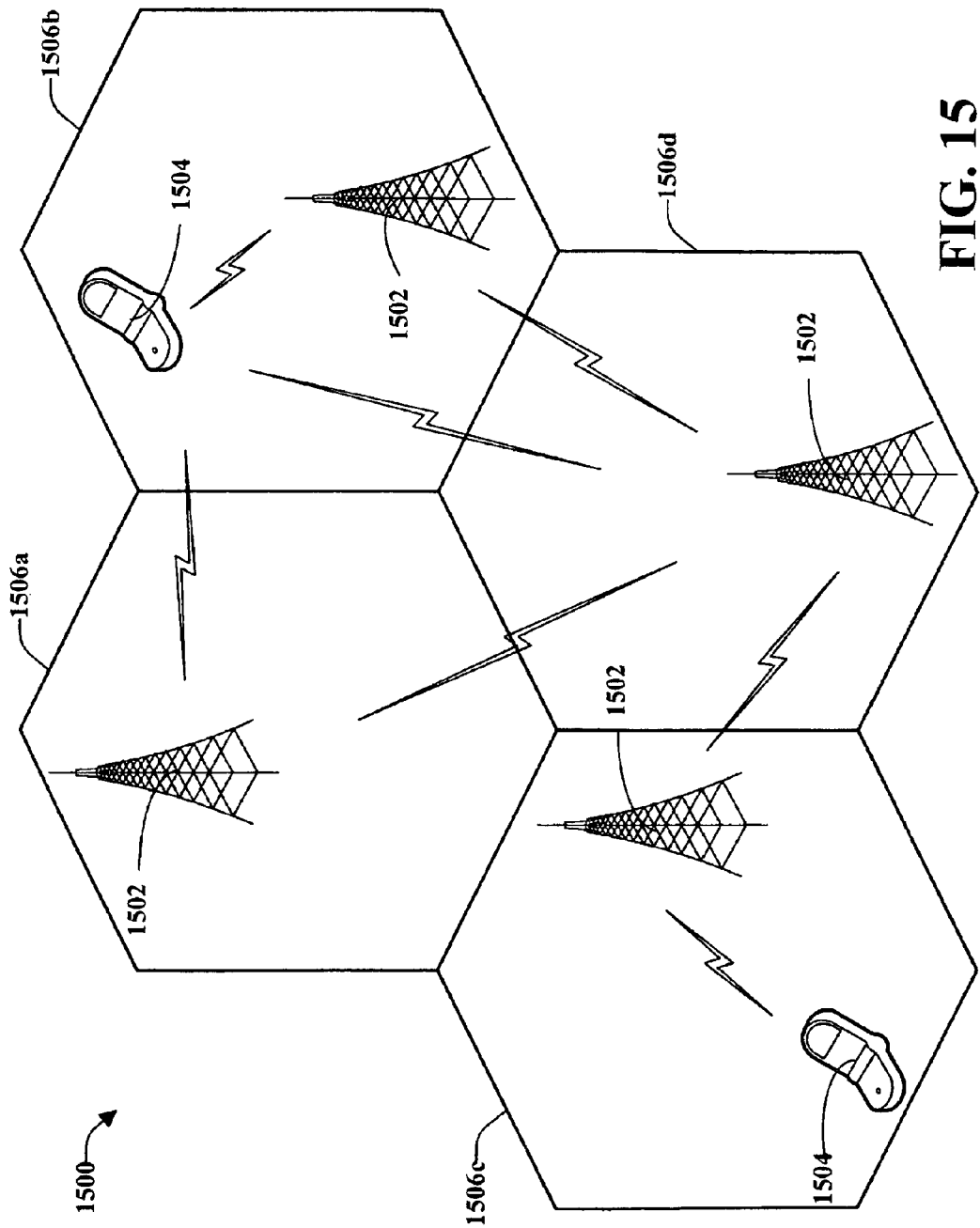
FIG. 15 depicts a block diagram of an example wireless signaling environment for wireless communications.

FIG. 15 is an illustration of a planned or semi-planned wireless communication environment 1500, in accordance with various aspects. System 1500 can comprise one or more BSs 1502 in one or more cells and/or sectors that receive, transmit, repeat, etc., wireless communication signals to each other and/or to one or more mobile devices 1504. As illustrated, each BS 1502 can provide communication coverage for a particular geographic area, illustrated as four geographic areas, labeled 1506a, 1506b, 1506c and 1506d. Each BS 1502 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 5), as will be appreciated by one skilled in the art. Mobile devices 1504 can be, for example, cellular phones, smart phones, laptops, handheld communication devices, handheld computing devices, satellite radios, global positioning systems, PDAs, or any other suitable device for communicating over wireless network 1500. System 1500 can be employed in conjunction with various aspects described herein in order to facilitate high-speed multi-carrier management in wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g. data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communications, comprising:
obtaining notification of a multi-carrier assignment for a user equipment (UE) in a wireless network;
employing a data processor to execute rules for managing UE interaction with at least one carrier of the multi-carrier assignment, the rules comprising:
analyzing a wireless condition pertaining to the UE or the wireless network;
generating a command to instruct the UE to activate or deactivate the at least one carrier based on the wireless condition; and
employing a communication interface to convey the command to the UE at least in part via physical layer signaling or layer two signaling.

2. The method of claim 1, further comprising employing the command to instruct the UE to activate or deactivate the at least one carrier.

3. The method of claim 2, further comprising:
obtaining a set of uplink feedback channels employed by the UE in response to activation or deactivation of the at least one carrier; and
employing a decoding scheme for the set of uplink feedback channels to decode channel quality indicator (CQI) or packet acknowledgment (ACK) and negative ACK (NACK) data transmitted by the UE over the set of uplink feedback channels.

4. The method of claim 1, further comprising employing a high speed shared control channel (HS-SCCH) command for the UE command and an HS-SCCH signal to convey the UE command to the UE.

5. The method of claim 1, further comprising obtaining a response from the UE indicating receipt or execution of the UE command by the UE.

6. The method of claim 1, further comprising employing at least one anchor or non-anchor carrier assigned to the UE to convey the UE command.

7. The method of claim 1, further comprising employing a discontinuous transmission (DTX) or discontinuous reception (DRX) protocol in conveying the UE command.

8. The method of claim 1, wherein the multi-carrier assignment is implemented by a layer three signaling protocol command at a radio network controller (RNC).

9. The method of claim 1, wherein the wireless condition comprises a measure of network loading.

10. The method of claim 9, wherein the network loading measure is determined by total power or code usage on a downlink, rise over thermal (RoT) indicator on an uplink, or by UE throughput, buffer status or quality of service performance or requirement on either the uplink or the downlink.

11. The method of claim 1, wherein the wireless condition comprises a measure of channel quality or throughput for the UE.

12. The method of claim 11, wherein the channel quality is determined by CQI on a downlink or scheduling information (SI) on an uplink.

13. A method for wireless communications, comprising:
obtaining notification of a multi-carrier assignment for a user equipment (UE) in a wireless network;
employing a data processor to execute rules for managing UE interaction with at least one carrier of the multi-carrier assignment, the rules comprising:
analyzing a wireless condition pertaining to the UE or the wireless network;
generating a command for the UE pertaining to the at least one carrier based on the wireless condition; and
employing a communication interface to convey the command to the UE via lower layer signaling; and
reserving a pair of HS-SCCH orders for each of at least one non-anchor carrier allocated to the UE for activation and deactivation, respectively, of the at least one non-anchor carrier.

14. The method of claim 13, wherein deactivation of the at least one non-anchor carrier comprises at least one of:
instructing the UE to ignore signals of the at least one non-anchor carrier other than a pilot signal or HS-SCCH signal; or
instructing the UE to ignore all signals of the non-anchor carrier.

15. An apparatus for wireless communications, comprising:
a data processor that executes a set of modules configured for managing user equipment (UE) interaction with a non-anchor wireless carrier, the set of modules comprising:
an interface module that obtains a notification of multi-carrier assignment for a UE served by the apparatus;
an analysis module that measures a wireless condition pertaining to a UE;
a control module that generates a management order to instruct the UE to activate or deactivate the non-anchor wireless carrier; and
a communication interface that conveys the management order to the UE at least in part on physical layer signaling or layer two signaling.

16. The apparatus of claim 15, wherein the control module employs the management order to instruct the UE to activate or deactivate the non-anchor wireless carrier.

17. The apparatus of claim 16, wherein:
the interface module obtains a set of uplink feedback channels employed by the UE in response to activation or deactivation of the non-anchor wireless carrier; and
the data processor employs a decoding scheme for the set of uplink feedback channels to decode channel quality indicator (CQI) or acknowledgment (ACK) and negative ACK (NACK) data transmitted by the UE over the set of uplink feedback channels.

18. The apparatus of claim 17, wherein at least one of:
the explicit command comprises a physical layer HS-SCCH order; or
the implicit command comprises a DTX or DRX message generated at least in part via a layer two signaling protocol.

19. The apparatus of claim 15, wherein the management order is an explicit command or an implicit command.

20. The apparatus of claim 15, further comprising a physical protocol module that generates a pair of HS-SCCH orders for the non-anchor carrier for activation and deactivation of the non-anchor carrier.

21. The apparatus of claim 20, wherein the physical protocol module at least one of:
instructs the UE to ignore signals of the non-anchor carrier; or
instructs the UE to monitor only a pilot signal or HS-SCCH signal of the non-anchor carrier.

22. The apparatus of claim 15, further comprising a feedback module that obtains a response from the UE indicating receipt or execution of the management order.

23. The apparatus of claim 15, wherein the communication interface employs an anchor carrier utilized by the UE to convey the management order.

24. The apparatus of claim 15, wherein the multi-carrier assignment is implemented on layer three protocols by a wireless network RNC serving the UE.

25. The apparatus of claim 15, further comprising a performance module that obtains a power consumption goal of the UE, wherein the power consumption goal is employed by the control module in generating the management order.

26. An apparatus for wireless communications, comprising:
a data processor that executes a set of modules configured for managing user equipment (UE) interaction with a non-anchor wireless carrier, the set of modules comprising:
an interface module that obtains a notification of multi-carrier assignment for a UE served by the apparatus;
an analysis module that measures a wireless condition pertaining to a UE;
a control module that generates a management order for the UE pertaining to the non-anchor wireless carrier;
a communication interface that conveys the management order to the UE on a lower layer signal; and
a loading module that establishes the wireless condition as a function of network loading.

27. The apparatus of claim 26, wherein the loading module measures downlink loading based on power or code usage or uplink loading based on measured RoT, or employs UE throughput, buffer state or quality of service (QoS) performance or requirement on either the downlink or uplink.

28. An apparatus for wireless communications, comprising:
a data processor that executes a set of modules configured for managing user equipment (UE) interaction with a non-anchor wireless carrier, the set of modules comprising:
an interface module that obtains a notification of multi-carrier assignment for a UE served by the apparatus;
an analysis module that measures a wireless condition pertaining to a UE;
a control module that generates a management order for the UE pertaining to the non-anchor wireless carrier;
a communication interface that conveys the management order to the UE on a lower layer signal; and
a channel analysis module that establishes the wireless condition as a function of channel quality or throughput for the UE.

29. The apparatus of claim 28, wherein the channel analysis module employs CQI or SI to establish the network condition.

30. An apparatus for wireless communications, comprising:
means for obtaining notification of a multi-carrier assignment for a user equipment (UE) in a wireless network;
means for employing a data processor to execute rules for managing UE interaction with at least one carrier of the multi-carrier assignment, the rules comprising:
analyzing a wireless condition pertaining to the UE or the wireless network;

generating a command to instruct the UE to activate or deactivate the at least one carrier based on the wireless condition; and means for conveying the command to the UE at least in part via physical layer signaling or layer two signaling.

31. At least one processor configured for wireless communications, comprising:
a first module for obtaining notification of a multi-carrier assignment for a user equipment (UE) in a wireless network;
a second module for analyzing a wireless condition pertaining to the UE or the wireless network;
a third module for generating a command to instruct the UE to activate or deactivate the at least one carrier based on the wireless condition; and
a fourth module for conveying the command to the UE at least in part via physical layer signaling or layer two signaling.

32. A non-transitory computer-readable medium, comprising:
a first set of codes for causing a computer to obtain notification of a multi-carrier assignment for a user equipment (UE) in a wireless network;
a second set of codes for causing the computer to analyze a wireless condition pertaining to the UE or the wireless network;
a third set of codes for causing the computer to generate a UE command to activate or deactivate the at least one carrier based on the wireless condition; and
a fourth set of codes for causing the computer to convey the command to the UE at least in part via physical layer signaling or layer two signaling.

33. A method for participating in wireless communications, comprising:
employing a wireless communication interface to obtain a multi-carrier assignment from a wireless network component;
employing the communication interface to obtain a physical layer or layer two signaling protocol message; and
employing a data processor to extract a command to activate or deactivate a non-anchor carrier of the multi-carrier assignment from the message;
initiating a timer upon receiving the command; and
obeying the command for a duration of the timer.

34. The method of claim 33, further comprising employing the data processor to decode a layer three signaling protocol message to obtain the multi-carrier assignment.

35. The method of claim 33, further comprising activating or deactivating the non-anchor carrier based on the command.

36. The method of claim 35, further comprising at least one of:
adjusting a set of uplink feedback channels employed in submitting channel feedback data based on the activation or deactivation of the non-anchor carrier, and submitting the adjusted feedback channels to a serving network access point; or
changing a channel quality indicator (CQI) or acknowledgment (ACK) and negative ACK (NACK) encoding format upon activation or deactivation of the non-anchor carrier, and submitting the changed encoding format to the serving network access point.

37. The method of claim 35, wherein deactivating the non-anchor carrier further comprises at least one of:
ignoring signaling on the non-anchor carrier;
terminating processing on the non-anchor carrier; or
ignoring non-pilot or non-shared control channel signaling on the non-anchor carrier.

38. The method of claim 33, further comprising activating or deactivating channel feedback for the non-anchor carrier based on the command.

39. The method of claim 33, further comprising at least one of:
obeying a multi-carrier command if such command is received prior to expiration of the timer, and resetting the timer;
returning to a default state upon expiration of the timer; or
returning to a previous state upon expiration of the timer.

40. The method of claim 33, further comprising decoding an HS-SCCH order to extract the command from the message.

41. The method of claim 33, wherein the message comprises signaling activity or lack of such activity occurring on a DTX or DRX cycle of a wireless channel.

42. The method of claim 41, further comprising inferring an order to activate or deactivate the non-anchor carrier based on the signaling activity or lack of such activity.

43. The method of claim 33, further comprising submitting CQI or SI data pertaining to a single or multi-carrier channel to a wireless network access point.

44. The method of claim 43, wherein the submission is in response to at least one of:
a request for channel data from the wireless network access point; or
a periodic channel submission defined by wireless network protocol.

45. The method of claim 33, further comprising submitting a performance, throughput or power preservation goal to a wireless network to facilitate network-based multi-carrier management based at least in part on the goal.

46. The method of claim 33, further comprising obeying, denying or modifying the command based on a performance, throughput or power consumption goal.

47. An apparatus for participating in wireless communications, comprising:
a wireless communication interface that obtains a multi-carrier assignment from a wireless network component, and that obtains a physical layer or layer two signaling protocol message;
a data processor to extract a command to activate or deactivate a non-anchor carrier of the multi-carrier assignment from the message; and
a timing module that sets a counter upon processing of the command by the data processor, wherein the apparatus obeys the command for a duration established by the counter.

48. The apparatus of claim 47, wherein the one layer of the wireless signaling protocol is a layer three signaling protocol.

49. The apparatus of claim 47, further comprising an activation module that initiates or deactivates a non-anchor carrier specified by the multi-carrier assignment.

50. The apparatus of claim 49, wherein the activation module at least one of:
adjusts uplink feedback channels employed in submitting channel feedback data in response to the activation or deactivation of the non-anchor carrier, and submits the adjusted feedback channels to a serving base station; or
changes a channel quality indicator (CQI) or acknowledgment (ACK) and negative ACK (NACK) encoding format in response to activation or deactivation of the non-anchor carrier, and submits the changed encoding format to the serving base station.

51. The apparatus of claim 49, wherein the activation module at least one of:
ignores signaling on the non-anchor carrier to deactivate such carrier; or
ignores non-pilot or non-shared control channel signaling on the non-anchor charier to deactivate such carrier.

52. The apparatus of claim 47, further comprising a feedback module that activates or deactivates channel reporting for the non-anchor carrier based on the command.

53. The apparatus of claim 47, further comprising a reporting module that submits CQI or SI data pertaining to a single or multi-carrier channel to a wireless network access point serving the apparatus.

54. The apparatus of claim 53, wherein the reporting module at least one of:
submits the data in response to a request from the access point; or
submits the response periodically when reporting is initiated by the wireless network.

55. The apparatus of claim 47, further comprising a management module that maintains an operation goal of the apparatus pertinent to the multi-carrier assignment.

56. The apparatus of claim 55, wherein the management module at least one of:
submits the operation goal to a serving network access point to facilitate network management of multi-carrier activity for the apparatus based on the goal; or
obeys, denies or modifies the command based on the goal to facilitate UE-moderated management of multi-carrier activity.

57. An apparatus for participating in wireless communications, comprising:
a wireless communication interface that obtains a multi-carrier assignment on one layer of a wireless signaling protocol, and a command pertaining to the multi-carrier assignment on a different layer of the wireless signaling protocol;
a data processor for processing the command and executing a set of modules for implementing the command; and
a timing module that sets a counter upon processing of the command by the data processor, wherein the apparatus obeys the command for a duration established by the counter.

58. The apparatus of claim 57, wherein the data processor at least one of:
obeys a subsequent multi-carrier command if such subsequent command is received within the duration;
returns the apparatus to a default single carrier state if no command is received within the duration; or
returns the apparatus to a prior state if no command is received within the duration.

59. An apparatus for participating in wireless communications, comprising:
a wireless communication interface that obtains a multi-carrier assignment on one layer of a wireless signaling protocol, and a command pertaining to the multi-carrier assignment on a different layer of the wireless signaling protocol;
a data processor for processing the command and executing a set of modules for implementing the command; and
an analysis module that decodes the command from the different layer of the wireless signaling protocol.

60. The apparatus of claim 59, wherein the analysis module decodes the command as at least one of:
a shared control channel order; or
a DRX or DTX logic order.

61. The apparatus of claim 60, wherein the data processor infers a command from the DRX or DTX logic order based on signaling activity on a DRX or DTX channel.

62. An apparatus for participating in wireless communications, comprising:
means for employing a wireless communication interface to obtain a multi-carrier assignment from a wireless network component;
means for employing the communication interface to obtain a physical layer or layer two signaling protocol message;
means for employing a data processor to extract a command to activate or deactivate a non-anchor carrier of the multi-carrier assignment from the message; and
means for employing a timing module to set a counter upon processing of the command by the data processor, wherein the apparatus obeys the command for a duration established by the counter.

63. At least one processor configured for participating in wireless communications, comprising: a first module for employing a wireless communication interface to obtain a multi-carrier assignment from a wireless network component; a second module for employing the communication interface to obtain a physical layer or layer two signaling protocol message; a third module for employing a data processor to extract a command to activate or deactivate a non-anchor carrier of the multi-carrier assignment from the message; and a fourth module for setting a counter upon processing of the command by the data processor, wherein the data processor obeys the command for a duration established by the counter.

64. A non-transitory computer-readable medium, comprising:
a first set of codes for causing a computer to employ a wireless communication interface to obtain a multi-carrier assignment from a wireless network component;
a second set of codes for causing the computer to employ the communication interface to obtain a physical layer or layer two signaling protocol message; a third set of codes for causing the computer to employ a data processor to extract a command to activate or deactivate a non-anchor carrier of the multi-carrier assignment from the message and a fourth set of codes for causing the computer to employ a timing module to set a counter upon processing of the command by the data processor, wherein the data processor obeys the command for a duration established by the counter.

* * * * *